US008419516B2

United States Patent
Masuda et al.

(10) Patent No.: US 8,419,516 B2
(45) Date of Patent: Apr. 16, 2013

(54) GAME SYSTEM AND GAME PROGRAM

(75) Inventors: Hiroyuki Masuda, Kobe (JP); Yoshito Fukuda, Kobe (JP); Naoko Matsumoto, Osaka (JP); Masanori Kono, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 222 days.

(21) Appl. No.: 12/848,909

(22) Filed: Aug. 2, 2010

(65) Prior Publication Data

US 2011/0034247 A1 Feb. 10, 2011

(30) Foreign Application Priority Data

Aug. 4, 2009 (JP) .................................. 2009-181387

(51) Int. Cl.
*A63F 9/24* (2006.01)
*A63F 13/00* (2006.01)
(52) U.S. Cl.
USPC .......... 463/7; 463/1; 463/35; 463/36; 463/37; 463/38; 463/43
(58) Field of Classification Search .......... 463/7, 35–38, 463/43, 1
See application file for complete search history.

(56) References Cited

U.S. PATENT DOCUMENTS

2007/0197290 A1* 8/2007 Ueshima ......................... 463/36
2007/0232374 A1* 10/2007 Lopiccolo et al. ................. 463/7

FOREIGN PATENT DOCUMENTS

JP 2001-096061 A 4/2001

* cited by examiner

*Primary Examiner* — Arthur O. Hall
*Assistant Examiner* — Jasson Yoo
(74) *Attorney, Agent, or Firm* — Edwards Wildman Palmer LLP; Brian R. Landry

(57) ABSTRACT

A game system guides operation timing of the operating section through a monitor by displaying an operation instructing indicator corresponding to the respective operation timings and an operation reference indicator corresponding to the current time in temporal order along a predetermined path on the game, and producing a relative displacement, which is along the predetermined path and is according to the progression of the time on the game, between the operation reference indicator and the operation instructing indicator in order that the operation instructing indicator agrees with the operation reference indicator at the operation timing that should be indicated by the operation instructing indicator, and changes at least either one of a starting position and a reaching position of the predetermined path.

15 Claims, 14 Drawing Sheets

GAME SYSTEM AND GAME PROGRAM

CROSS REFERENCE TO RELATED APPLICATIONS

This application claims priority to Japanese Patent Application No. 2009-181387, filed Aug. 4, 2009, the entire disclosure of which is incorporated herein by this reference.

BACKGROUND OF THE INVENTION

1. Field of the Invention

The present invention relates to a game system and a game program.

2. Description of the Related Arts

A music game has been known in which a note bar corresponding to a rhythm sound is displayed along a predetermined path, and the note bar is moved toward an operation reference indicator in order that the note bar agrees with the operation reference indicator at an operation timing, whereby the operation timing is guided (see, for example, Japanese Patent Application Laid-Open No. 2001-96061).

SUMMARY OF THE INVENTION

In the apparatus disclosed in Japanese Patent Application Laid-Open No. 2001-96061, a time axis serving as a predetermined path is fixed, so that there is no change in the operation guidance such as the path or the displacement direction of the note bar. Therefore, the function other than the guidance for the operation cannot be imparted to the operation guidance.

In view of this, the present invention aims to provide a game system and a game program that can allow the operation guidance to function as a means for enhancing variety of a game.

A game system according to the present invention comprises: an input device (4) having at least one operating section (7, 8, 9); a display device (5) that displays and outputs a game screen (51, 52); a sequence data storage device (20) that stores sequence data (28) having described therein an operation timing of the operating section during the game; and an operation guiding device (10) that determines an operation timing of the operating section, which timing is included within a predetermined period range from a current time on the game to the future, based upon the sequence data, displays an operation instructing indicator (106) corresponding to the determined respective operation timings and an operation reference indicator (105) corresponding to the current time in temporal order along a predetermined path (104) on the game, and produces a relative displacement, which is along the predetermined path and is according to the progression of the time on the game, between the operation reference indicator and the operation instructing indicator in order that the operation instructing indicator agrees with the operation reference indicator at the operation timing that should be indicated by the operation instructing indicator, by which the operation on the operating section is guided to a player, wherein the operation guiding device includes a path changing device (10) that changes at least either one of a starting position (102) and a reaching position (103) of the predetermined path.

A computer program for a game system according to the present invention is constituted to allow a computer incorporated into a game system, which comprises an input device (4) having at least one operating section (7, 8, 9), a display device (5) that displays and outputs a game screen (51, 52), and a sequence data storage device (20) that stores sequence data (28) having described therein an operation timing of the operating section during the game, to serve as: an operation guiding device (10) that determines an operation timing of the operating section, which timing is included within a predetermined period range from a current time on the game to the future, based upon the sequence data, displays an operation instructing indicator (106) corresponding to the determined respective operation timings and an operation reference indicator (105) corresponding to the current time in temporal order along a predetermined path (104) on the game, and produces a relative displacement, which is along the predetermined path and is according to the progression of the time on the game, between the operation reference indicator and the operation instructing indicator in order that the operation instructing indicator agrees with the operation reference indicator at the operation timing that should be indicated by the operation instructing indicator, by which the operation on the operating section is guided to a player, wherein the operation guiding device to serve further as a path changing device (10) that changes at least either one of a starting position (102) and a reaching position (103) of the predetermined path.

According to the present invention, at least either one of the starting position and the reaching position of the predetermined path in which the operation instructing indicator and the operation reference indicator are arranged in temporal order can be changed. The relative displacement along the path is produced between the operation instructing indicator and the operation reference indicator. Therefore, when at least either one of the starting position and the reaching position of the path is changed, the path of the relative displacement produced between the operation instructing indicator and the operation reference indicator can be changed. The operation on the operating section is guided by the operation instructing indicator and the operation reference indicator. Therefore, when the relative displacement along the path between the operation instructing indicator and the operation reference indicator is changed, the operation guidance to the player can be changed. Thus, the operation guidance can be functioned as a means for enhancing variety of the game.

The path changing device may change at least either one of the starting position and the reaching position of the predetermined path in any form. For example, in one aspect of the game system according to the present invention, the operation guiding device sets the initial position (105D) of the operation reference indicator, which is arranged on the predetermined path in order to produce the relative displacement along the predetermined path, to a predetermined position (105D) in the game screen as a normal state for the initial position, and wherein the path changing device may change at least either one of the starting position and the reaching position of the predetermined path in order that the initial position of the operation reference indicator is changed from the predetermined position in the game screen as an exceptional state with respect to the normal state for the initial position. In this case, the initial position of the operation reference indicator changes by the change of at least either one of the starting position and the reaching position of the predetermined path. Therefore, a great change can be produced in the operation guidance.

According to one aspect of the game system according to the present invention, the operation guiding device may include an area position changing device (10) that sets the operation instructing area (101), which is an area on which the operation instructing indicator and the operation reference indicator are displayed, to a predetermined position in the game screen as a normal state for an area position, and change the position of the area, which is set as the operation instructing area in the game screen, as an exceptional state with respect to the normal state for the area position, wherein the path changing device may change at least either one of the starting position and the reaching position of the predetermined path in order that the operation instructing indicator and the operation reference indicator are displayed in the operation instructing area in the exceptional state for the area position. In this case, the display position can be changed in an area unit, which is the operation instructing area, having a fixed size. Specifically, the arrangement of the operation instructing area, having the operation reference indicator and the like displayed therein, in the game screen can be changed, whereby the layout of the whole game screen can be changed. Thus, the operation guidance for the player can more dynamically be changed.

According to one aspect of the game system according to the present invention, the input device may include operating sections, the operation timing may be written in the sequence data as being associated with information designating any one of the operating sections, and the operation guiding device may display the operation instructing indicator in the manner in which the operating section corresponding to each operation timing can be identified. In this case, the operation timing of each operating section can be guided in identifiable manner, even if the input device includes plural operating sections.

When the input device includes operating sections, the operation guiding device may display the operation instructing indicator in any manner, so long as the operating section corresponding to each operation timing can be identified. For example, in one aspect of the game system according to the present invention, the operation guiding device may specify plural predetermined paths so as to correspond to the operating sections, wherein the operation instructing indicator corresponding to each operation timing may be displayed in temporal order along the predetermined path corresponding to each of the operating sections on the game, whereby the operation instructing indicator may be displayed in the manner in which the operating section corresponding to each operation timing can be identified.

Any input devices may be used as the input device including operating sections. For example, in one aspect of the game system according to the present invention, a guitar controller which is shaped like a guitar may be provided as the input device, which includes a body, a neck extending from the body, a head arranged at the leading end of the neck, and as the plural operating sections, a low-fret operating section arranged in the vicinity of the head of the neck and a high-fret operating section arranged in the vicinity of the neck, and wherein the sequence data may include a high-fret operation describing section in which operation timings for the high-fret operating section are successive, and the path changing device may change at least either one of the starting position and the reaching position of the predetermined path when the first operation timing described in the high-fret describing section has come.

When the guitar controller is provided as the input device, the path changing device may change at least either one of the starting position and the reaching position of the predetermined path in any form. For example, in one aspect of the game system according to the present invention, the operation guiding device may set the starting position and the reaching position in such a manner that the predetermined path is located at the lower part of the game screen as a normal state for the display, and the path changing device may change the starting position and the reaching position of the predetermined path, as an exceptional state with respect to the normal state for the display, in such a manner that the starting position and the reaching position of the predetermined path is located at the upper part of the game screen, when the first operation timing described in the high-fret operation describing section has come. Further, the operation guiding device may set the starting position above the reaching position, as a normal state for a displacement, in order that the relative displacement along the predetermined path between the operation reference indicator and the operation instructing indicator is produced from the upper part to the lower part, and the path changing device may change at least either one of the starting position and the reaching position of the predetermined path, as an exceptional state with respect to the normal state for the displacement, in such a manner that the starting position is located below the reaching position and relative displacement along the predetermined path between the operation reference indicator and the operation instructing indicator is produced from the lower part toward the upper part.

According to one aspect of the game system according to the present invention, the path changing device may change either one of the starting position and the reaching position of the predetermined path according to a predetermined operation for the input device. In this case, a player can appropriately change the starting position and the reaching position of the predetermined path, i.e., the position where the operation instructing indicator and the operation reference indicator are displayed, based upon the player's intention. Thus, the degree of freedom involved with the player's operation, such as the player's eye and posture, during the game can be enhanced.

According to one aspect of the game system according to the present invention, the game system may further comprises a sound output device (6) that reproduces and outputs a game sound, a music composition data storage device (20) that stores music composition data for reproducing music composition data, and a music composition reproducing device (10) that reproduces the music composition from the sound output device based upon the music composition data, wherein the sequence data may have described therein the operation timing of the operating section during the reproduction of the music composition, and the operation guiding device may determine the operation timing of the operating section included in a predetermined period from the current time toward the future on the music composition, based upon the sequence data, and may produce the relative displacement along the predetermined path between the operation reference indicator and the operation instructing indicator according to the progression of the time on the music composition. In this case, the operation at the operating section is guided according to the progression of the music composition. Therefore, the operation guidance can be functioned as a means for enhancing variety of the music game.

The operation guiding device may produce any displacement, so long as it produces the relative displacement along the predetermined path between the operation reference indicator and the operation instructing indicator according to the progression of the time on the music composition. For example, in one aspect of the game system according to the present invention, the operation guiding device may produce the relative displacement along the predetermined path by moving the operation instructing indicator toward the operation reference indicator.

In the above description, the reference numerals in the attached drawings are parenthesized in order to facilitate understanding of the present invention. However, this does not limit the present invention to the embodiment illustrated in the drawings.

EFFECT OF THE INVENTION

As described above, the present invention can allow the operation guidance to function as a means for enhancing variety of a game.

DETAILED DESCRIPTION OF THE EMBODIMENTS

Figure 1:
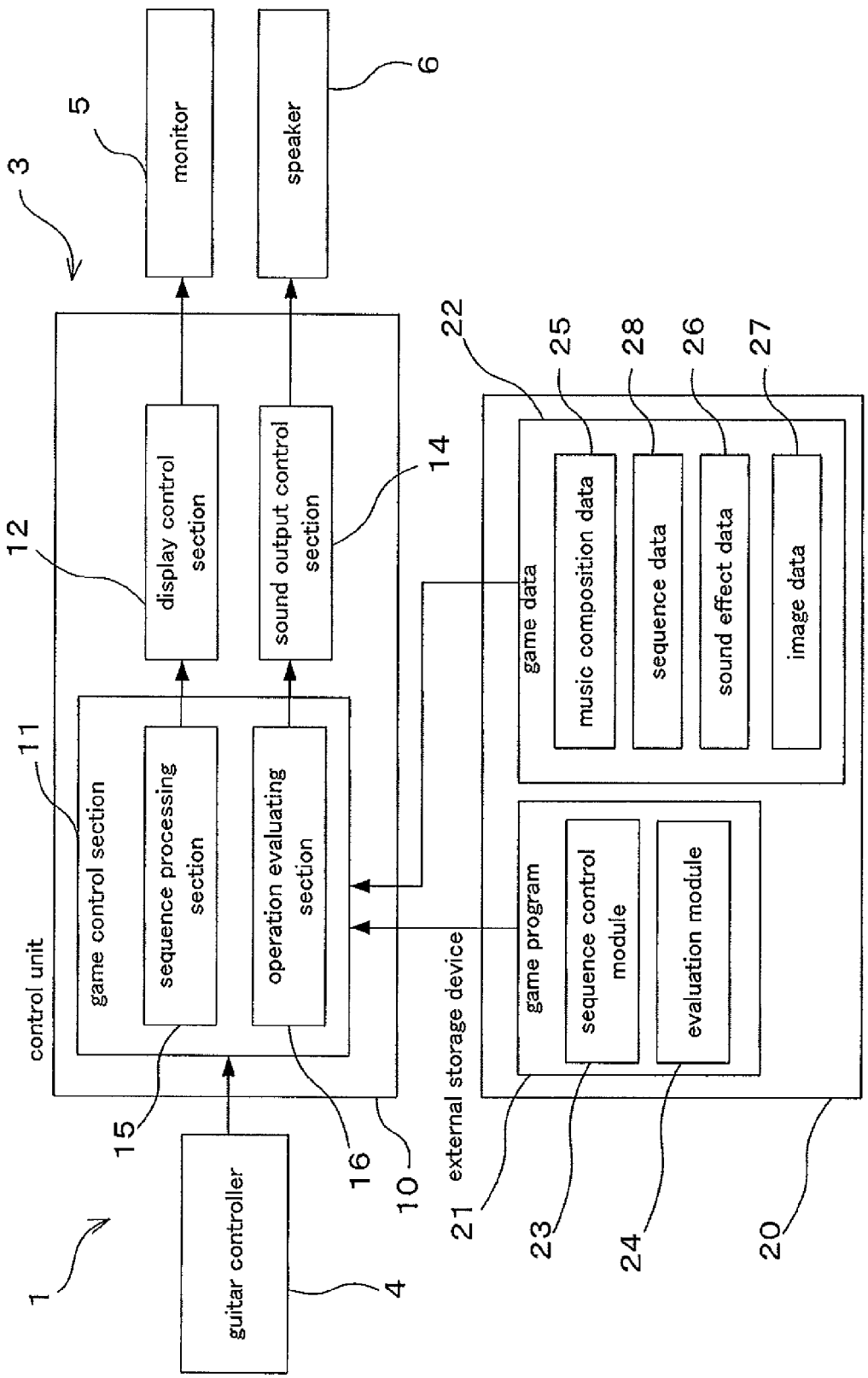
FIG. 1 is a block diagram illustrating a function of a game machine according to one embodiment of the present invention.

One embodiment of a game machine according to the present invention will be described below. As illustrated in FIG. 1, a game machine 1 includes a main body 3, a guitar controller 4 as an input device, a monitor 5 as a display device, and a speaker 6 as a sound output device. The main body 3 of the game machine is provided with an unillustrated selecting means such as a push-button switch or an arrow key used for a progression of a game.

Figure 2:
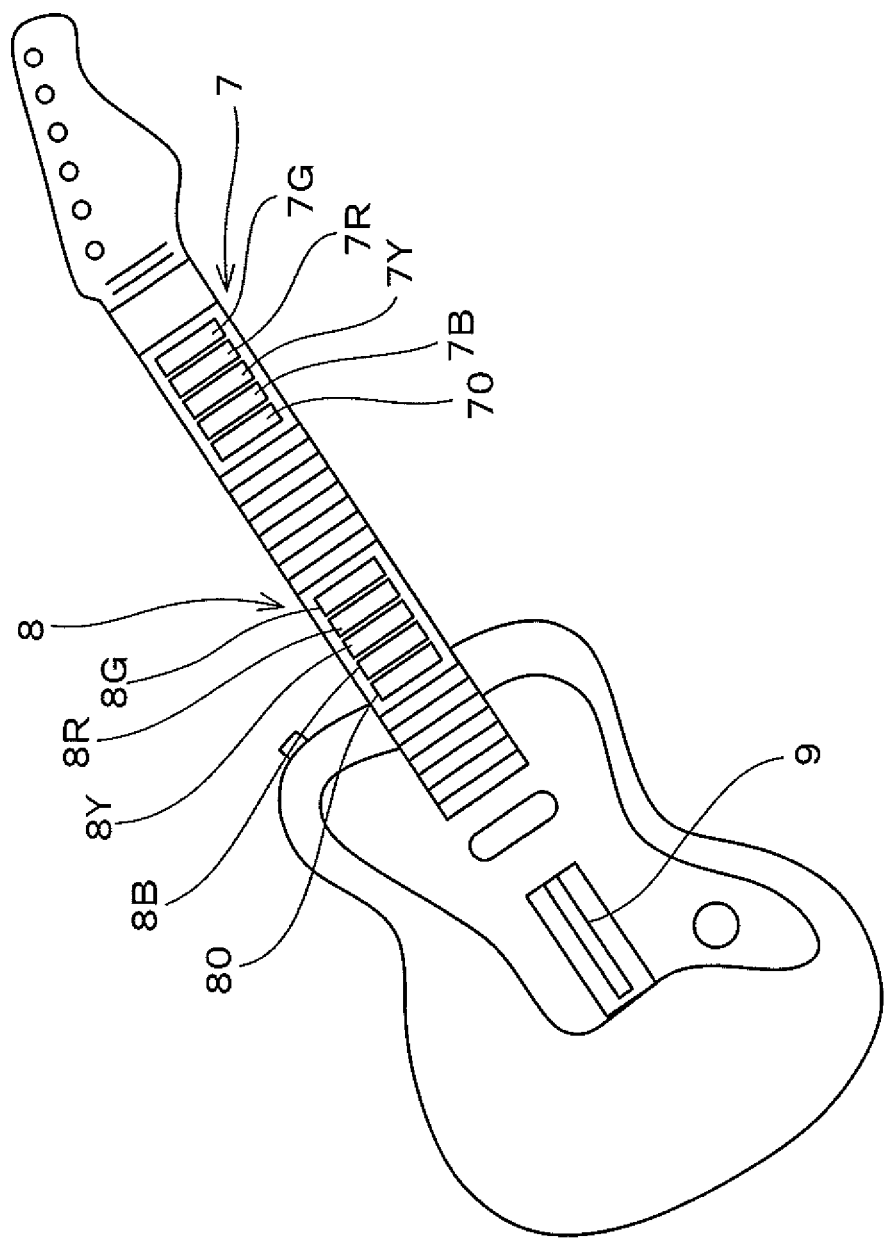
FIG. 2 is an enlarged view of a guitar controller.

FIG. 2 is an enlarged view of the guitar controller 4. The guitar controller 4 imitates a so-called guitar in a shape and a size. The guitar controller 4 is provided with a low-fret operating section 7 and a high-fret operating section 8 at the portion corresponding to a neck of the guitar. The low-fret operating section 7 is provided in the vicinity of the portion corresponding to a head of the guitar, while the high-fret operating section 8 is provided in the vicinity of the portion corresponding to a body of the guitar. The low-fret operating section 7 has five sound selecting buttons 7G, 7R, 7Y, 7B, and 7O in this order from the head to the body, these buttons being coded in colors of green, red, yellow, blue, and orange, respectively. Similarly, the high-fret operating section 8 has five sound selecting buttons 8G, 8R, 8Y, 8B, and 8O in this order from the head to the body, these buttons being coded in colors. When a player operates to select the respective buttons 7G to 7O and 8G to 8O, a selecting signal different for every buttons 7G to 7O and 8G to 8O is output.

A picking lever 9 is provided in the vicinity of a center of the body of the guitar controller 4. The picking lever 9 is used to simulate an operation of playing guitar strings, and it is operated by a player like guitar strings. Therefore, the picking lever 9 is provided so as to be capable of rotating within only a fixed range in the vertical direction about a mounting portion to the body. An unillustrated elastic member is provided at the mounting portion of the picking lever 9 in order that the picking lever 9 is held at substantially the center of the fixed range where the picking lever 9 can be rotated. The picking lever 9 is also provided with an unillustrated sensor for detecting the operation. With this, when the player operates to rotate the picking lever 9, the guitar controller 4 detects this operation, and can output this operation as a signal. The player holds the guitar controller 4 as if he/she holds a guitar, and operates the respective buttons 7, 8, and 9 of the guitar controller 4 as if he/she plays a guitar. The low-fret operating section 7, the high-fret operating section 8, and the picking lever 9 correspond to an operating section. The guitar controller 4 is also provided with an unillustrated tilt detecting device for detecting the tilt of the guitar controller 4. The guitar controller 4 is configured to be capable of outputting information of the tilt detected by the tilt detecting device. As a tilt detecting device, the well-known technique such as a tilt sensor, an acceleration sensor are employed. The guitar controller 4 is also provided with unillustrated operation button and the like for selecting or stopping the progression of the game.

As illustrated in FIG. 1, a control unit 10 as a computer is provided in the main body 3. The control unit 10 includes a game control section 11 serving as a main controller, and a display control section 12 and a sound output control section 14, which operate according to the output from the game control section 11. The game control section 11 is configured as a unit formed by combining a microprocessor and various peripheral devices such as an internal storage device (for example, ROM and RAM) necessary for the operation of the microprocessor. The display control section 12 draws an image according to drawing data given from the game control section 11 on a frame buffer, and outputs a video signal corresponding to the drawn image to the monitor 5, thereby displaying a predetermined image onto the monitor 5. The sound output control section 14 generates a sound reproducing signal according to sound reproducing data given from the game control section 11 and outputs the resultant to the speaker 6, thereby reproducing a predetermined music composition (including sound effect) from the speaker 6.

The guitar controller 4 is connected to the control unit 10. In addition, various input devices, such as the controller provided with the push-button switch, and the arrow key, may be connected to the control unit 10. An external storage device 20 is connected to the main body 3. Examples of usable external storage device 20 include a storage medium such as an optical storage medium, e.g., DVDROM or CDROM, or a non-volatile semiconductor device, e.g., EEPROM, which can hold the data even if power is not supplied thereto. Since the external storage device 20 is connected to the main body 3, the game control section 11 can read the various programs and various data pieces stored in the external storage device 20.

The external storage device 20 stores a game program 21 and game data 22. The game program 21 is a computer program necessary for executing a music game on the game machine 1 in accordance with a predetermined procedure. The game program 21 includes a sequence control module 23 and an evaluation module 24 for realizing the function according to the present invention. When the main body 3 is started, the game control section 11 executes an operation program stored in an internal storage device so as to execute various processes necessary for operating as the game machine 1, and then, reads and executed the game program 21 from the external storage device 20, thereby setting an environment for executing the music game in accordance with the game program 21. When the game control section 11 executes the sequence control module 23 of the game program 21, a sequence processing section 15 is generated in the game control section 11. When the game control section 11 executes the evaluation module 24 of the game program 21, an operation evaluating section 16 is generated in the game control section 11. The sequence processing section 15 and the operation evaluating section 16 are logical devices realized by the combination of a computer hardware and a computer program. The sequence processing section 15 gives an instruction to the player to operate with the reproduction of the music (music composition) selected by the player, or executes a music game process of generating a production such as sound effect according to the operation by the player. The operation evaluating section 16 executes a process of evaluating the operation of the player. The game program 21 also includes various program modules necessary for executing the music game in addition to the above-mentioned modules 23 and 24, and the game control section 11 has logical devices corresponding to these modules. However, these devices are not illustrated in the figure.

The game data 22 includes various data pieces that should be referred to when the music game is executed in accordance with the game program 21. For example, the game data 22 includes music composition data 25, sound effect data 26, and image data 27. The music composition data 25 is data necessary for reproducing and outputting the music composition, which is the subject of the game, from the speaker 6. In FIG. 1, one type of music composition data 25 is illustrated. However, the player can actually select a music composition to be played from plural music compositions. The plural music composition data pieces 25 are recorded in the game data 22 with the information for identifying the respective compositions attached thereto. The sound effect data 26 is data in which plural types of sound effects that should be output from the speaker 6 in response to the operation of the player are recorded as associated with a unique code for every sound effect. The sound effect includes a sound of a musical instrument and various other types of sound. The sound effect data is prepared in a predetermined octave number with a pitch changed. The image data 27 is data for displaying a background image, various objects, icons, etc. in the game screen on the monitor 5.

The game data 22 also includes sequence data 28. The sequence data 28 is data defining an operation that should be instructed to the player. A minimum of one sequence data piece 28 is prepared for one music composition data piece 25. The sequence data 28 will be described in detail later.

Figure 3:
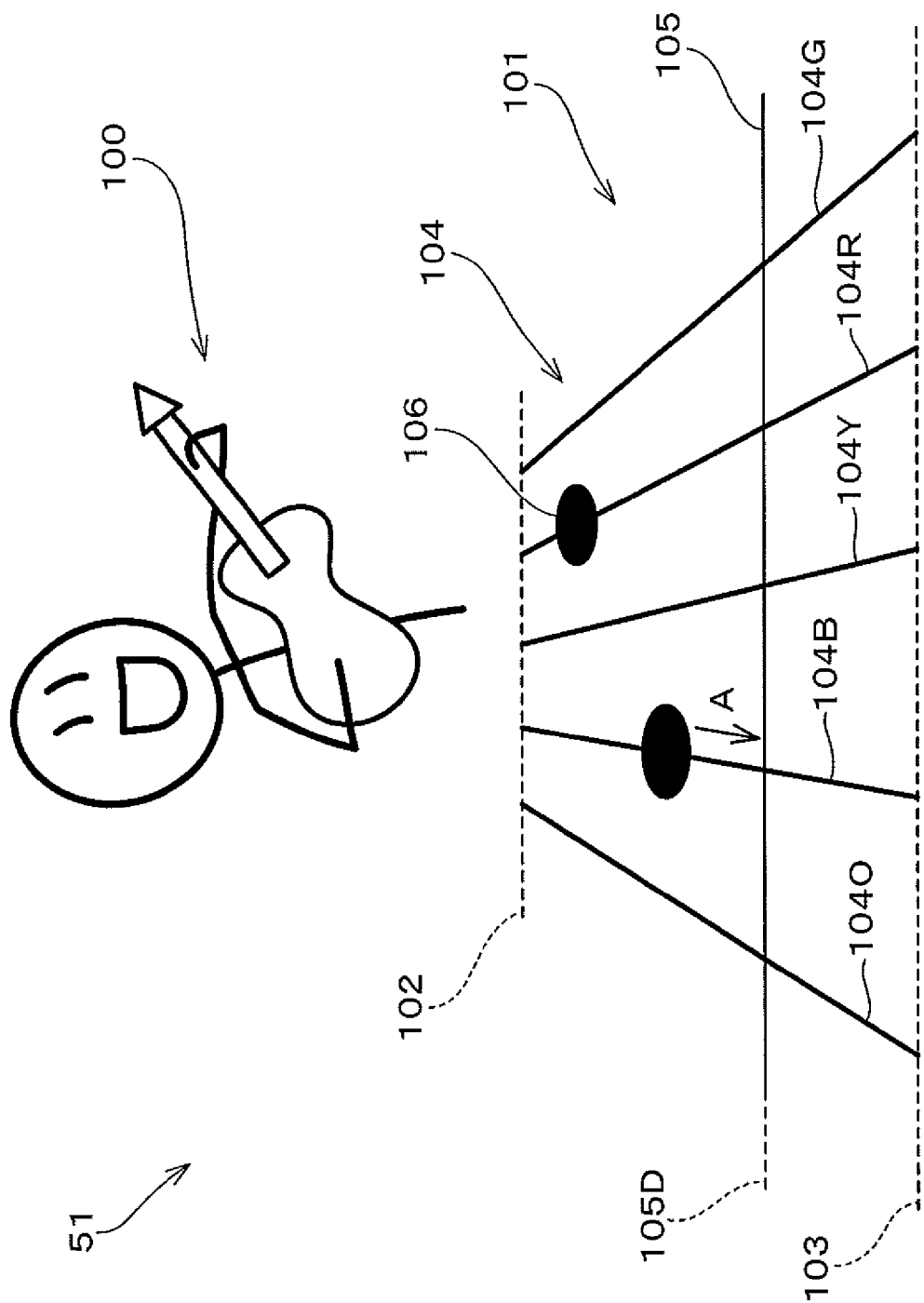
FIG. 3 is a view schematically illustrating a game screen during a normal play.
Figure 4:
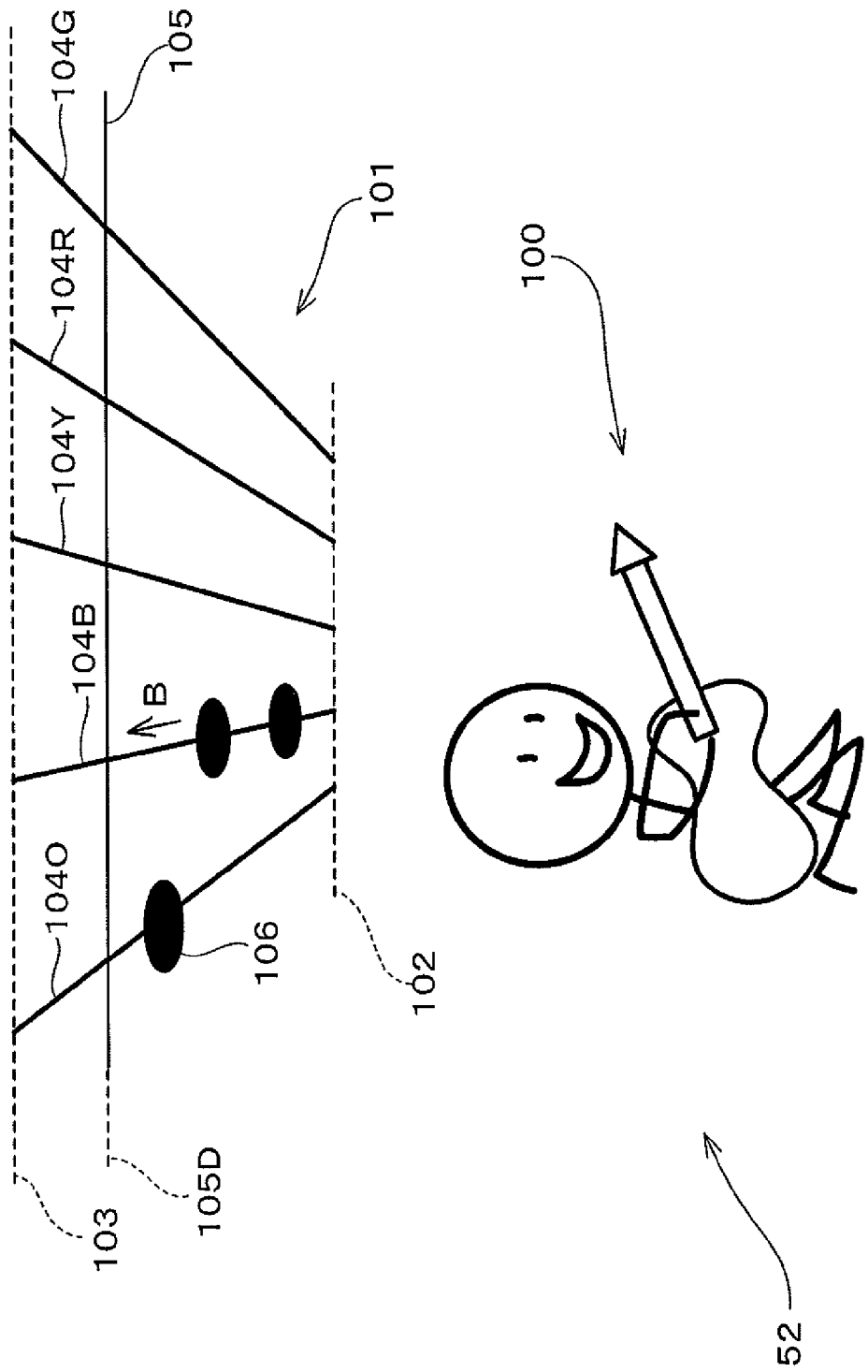
FIG. 4 is a view schematically illustrating a game screen during a right-hand play.

The outline of the music game executed by the game machine 1 will next be described. FIG. 3 is a view schematically illustrating a game screen 51 in a normal state displayed on the monitor 5. As illustrated in FIG. 3, a character 100 modeled the player is displayed on the monitor 5 during the execution of the music game on the game machine 1. An operation instructing area 101 is displayed below the character 100, i.e., at the lower part of the game screen 51. Specifically, the game screen 51 includes the display of character 100 and that of operation instructing area 101. In the operation instructing area 101, five lanes 104G, 104R, 104Y, 104B, and 104O extending from a start position 102 at the far side of the screen indicated by a broken line toward a reaching position 103 at the near side of the screen are displayed. When these lanes 104G to 104O are not distinguished, it is expressed by the lane 104 below. In FIGS. 3 and 4, the start position 102 and the reaching position 103 are indicated by the broken line, but the broken line is not displayed on the actual game screen. The start position 102 and the reaching position 103 may be displayed on the actual game screen, or the start position 102 and the reaching position 103 of the respective lanes 104G to 104O may not be at uniform position indicated by a straight line, but may be different from each other.

The respective lanes 104G to 104O are arranged in the order of the green lane 104G, red lane 104R, yellow lane 104Y, blue lane 104B, and orange lane 104O from the right toward the left in FIG. 3. The respective lanes 104G to 104O correspond to the respective buttons 7G to 7O on the low-fret operating section 7 of the guitar controller 4. Specifically, the green lane 104G corresponds to the sound selecting button 7G, the red lane 104R corresponds to the sound selecting button 7R, the yellow lane 104Y corresponds to the sound selecting button 7Y, the blue lane 104B corresponds to the sound selecting button 7B, and the orange lane 104O corresponds to the sound selecting button 7O. The respective lanes 104G to 104O are displayed in such a manner that the spaces of these lanes gradually increases from the start position 102 toward the reaching position 103. A straight line crossing the respective lanes 104G to 104O is displayed in the vicinity of the reaching position 103 as an operation reference indicator 105. Specifically, the operation reference indicator 105 is located, as an initial position 105D, at the lower side of the operation instructing area 101, i.e., at the lower part of the game screen 51. An object 106 as an operation instructing indicator and corresponding to each of the buttons 7G to 7O at the low-fret operating section 7 is appropriately displayed on the respective lanes 104G to 104O during the execution of the music game, i.e., during the progression of the reproduction of the music composition.

The object 106 appears at the start position 102 of the respective lanes 104G to 104O at a suitable timing of the music composition, and moves toward the reaching position 103 with a speed synchronous with the reproduction of the music composition as indicated by an arrow A. When the player selects and operates each of the buttons 7G to 7O corresponding to each of the lanes 104G to 104O on which the object 106 moves, with the timing when the object 106 reaches the operation reference indicator 105, and operates the picking lever 9, a time lag between the time when these operations are made and the time when the object 106 agrees with the operation reference indicator 105 is detected. As the time lag is small, the operation of the player is highly evaluated. Further, the sound effect according to the selecting operation of the buttons 7G to 7O is reproduced from the speaker. The example in FIG. 3 shows the state immediately before the object 106 on the blue lane 104B reaches the operation reference indicator 105. The player may select and operate the sound selecting button 7B on the low-fret operating section 7 corresponding to the blue lane 104B and operate the picking lever 9 at the timing when the object 106 reaches the operation reference indicator 105. The object 106 may be displayed with the color corresponding to the displayed lane of the lanes 104G to 104O. When the object is coded with the color, the player is easy to identify which lane the object 106 corresponds to.

During the game, the game screen 51 is changed to a right-hand playing screen at a suitable timing of the music composition. FIG. 4 is a view schematically illustrating the game screen 52 displayed on the monitor 5 during the right-hand play. The right-hand play corresponds to a so-called right-hand play of a guitar, and indicates a play in which guitar strings are tapped with a right hand. The strings near the body of the guitar are generally tapped in the right-hand play. During the right-hand play, the playing posture of the player mostly changes, i.e., the player maintains a low posture or the player plays a guitar as lifting the neck of the guitar upward.

As illustrated in FIG. 4, the character 100 moves to the lower part on the game screen 52 upon the right-hand play, compared to the game screen 51 in the normal play. The operation instructing area 101 moves to the position above the character 100. Specifically, the starting position 102, the reaching position 103, and the initial position 105D of the operation reference indicator 105 of the respective lanes 104G to 104O move to the upper part of the game screen. On the game screen 51 in the normal play, the starting position 102 is located above the reaching position 103. However, on the game screen 52 in the right-hand play, the starting position 102 is located below the reaching position 103. Specifically, the vertical positional relationship between the starting position 102 and the reaching position 103 on the game screen 52 during the right-hand play is reversed, compared to the game screen 51 during the normal play. Therefore, on the game screen 51 during the normal play, the object 106 moves from the upper part to the lower part, i.e., moves in the direction indicated by the arrow A in FIG. 3, while the object 106 on the game screen 52 during the right-hand play moves from the lower part to the upper part, i.e., moves in the direction indicated by an arrow B in FIG. 4. Specifically, the moving direction of the object 106 is inversed between the game screen 51 during the normal play and the game screen 52 during the right-hand play.

On the game screen 52 during the right-hand play, each of the respective lanes 104G to 104O corresponds to each of the buttons 8G to 8O at the high-fret operating section 8 for every corresponding color. Specifically, the correspondence relationship between the respective lanes 104G to 104O and the respective buttons on the guitar controller 4 is changed from the respective buttons 7G to 7O at the low-fret operating section 7 to the respective buttons 8G to 8O at the high-fret operating section 8. The object 106 corresponding to the respective buttons 8G to 8O at the high-fret operating section 8 is appropriately displayed on the respective lanes 104G to 104O. The object 106 appears at the starting position 102 of the respective lanes 104G to 104O at a suitable timing in the music composition, and moves toward the reaching position 103 with a speed synchronous with the reproduction of the music composition as indicated by the arrow B. When the player selects and operates each of the buttons 8G to 8O corresponding to each of the lanes 104G to 104O on which the object 106 moves, with the timing when the object 106 reaches the operation reference indicator 105, a time lag between the time when this operation is made and the time when the object 106 agrees with the operation reference indicator 105 is detected. As the time lag is small, the operation of the player is highly evaluated. Further, the sound effect according to the selecting operation of the buttons 8G to 8O is reproduced from the speaker 6, like the game screen 51 during the normal play.

The example in FIG. 4 shows the state immediately before the object 106 on the orange lane 104O reaches the operation reference indicator 105. The player may select and operate the sound selecting button 8O on the high-fret operating section 8 corresponding to the orange lane 104O at the timing when the object 106 reaches the operation reference indicator 105. FIG. 4 illustrates that the character 100 maintains a low posture for promoting the right-hand play and taps the portion near the body of the guitar, which is held by the character 100, with the right hand. When the player selects and operates the respective buttons 7G to 7O at the low-fret operating section 7 and operates the picking lever 9 on the game screen 52 during the right-hand play, these operations are enabled. It is to be noted that, during the right-hand play, the display amount of the object 106 increases in most cases. When the low-fret operating section 7 is used, the operation amount increases more in an amount corresponding to the operation of the picking lever 9, compared to the case in which the high-fret operating section 8 is used. Therefore, the use of the high-fret operating section 8 is naturally promoted during the right-hand play. The selecting operation of the high-fret operating section 8 is enabled even on the game screen 51 for the normal play.

Figure 5:
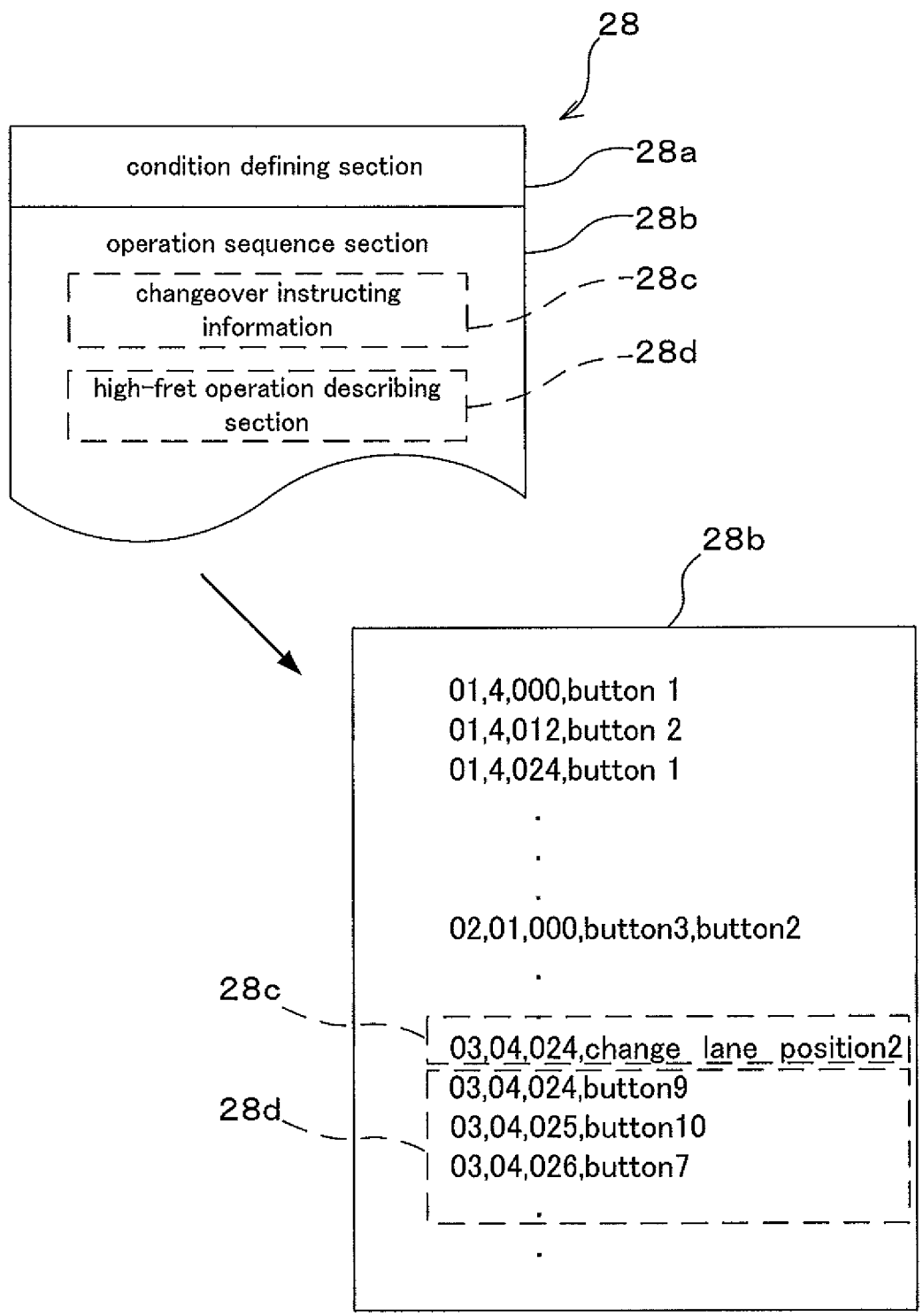
FIG. 5 is a view illustrating one example of a content of sequence data.

The detail of the sequence data 28 will next be described with reference to FIG. 5. As illustrated in FIG. 5, the sequence data 28 includes a condition defining section 28a and an operation sequence section 28b. On the condition defining section 28a, information pieces that designate various conditions for executing the game are written. Examples of the information pieces described above include information for designating a tempo, beat, track, or sound effect that should be produced when each of the buttons 7G to 7O and 8G to 8O is operated, the information for designating the correspondence relationship between the time lag of the above-mentioned operation timing and the evaluation, etc.

On the other hand, on the operation sequence section 28b, the timing when either one of the operation of each of the buttons 7G to 7O on the low-fret operation section 7 and the operation for the picking lever 9, or the selecting operation of each of the buttons 8G to 8O on the high-fret operating section 8 should be made is written as being associated with the time in the music composition. Specifically, as partially illustrated in FIG. 5, the operation sequence section 28b is composed of a set of plural records in which the timing (operation timing) when the operation should be made in the music composition and the operating section (respective buttons 7G to 7O, 8G to 8O) are associated with each other. The operation timing is written in such a manner that values each indicating a bar, a number of beat, and a time in the beat are described in a comma-delimited manner. The time in the beat is an elapsed time from the head of one beat. The time length of one beat is equally divided into n unit times, and is expressed by a number of means from the head. For example, when the time that is the second beat in the first bar in the music composition, and when ¼ has elapsed from the head of the beat is designated as the operation timing, it is written as "01, 2, n/4".

Each of the buttons 7G to 7O and 8G to 8O is designated by "button 1" to "button 10", which is the description in which a unique number corresponding to the respective buttons 7G to 7O and 8G to 8O is attached respectively to "button". Specifically, the sound selecting button 7G is written as "button 1", the sound selecting button 7R is written as "button 2", the sound selecting button 7Y is written as "button 3", the sound selecting button 7B is written as "button 4", and the sound selecting button 7O is written as "button 5". Similarly, the sound selecting button 8G is written as "button 6", the sound selecting button 8R is written as "button 7", the sound selecting button 8Y is written as "button 8", the sound selecting button 8B is written as "button 9", and the sound selecting button 8O is written as "button 10". The designation of each of the buttons 7G to 7O and 8G to 8O respectively corresponds to the designation of each of the lanes 104G to 104O. Specifically, the description of the "button 1" corresponds to the designation of the green lane 104G, the description of the "button 2" corresponds to the designation of the red lane 104R, the description of the "button 3" corresponds to the designation of the yellow lane 104Y, the description of the "button 4" corresponds to the designation of the blue lane 104B, and the description of the "button 5" corresponds to the designation of the orange lane 104O. Similarly, the designation of the "button 6" to "button 10" respectively corresponds to the designation of each of the lanes 104G to 104O corresponding to each of the buttons 8G to 8O at the high-fret operating section 8. In the example of FIG. 5, the player selects and operates the sound selecting button 7G on the low-fret operating section 7 and operates the picking lever 9 at the starting point (000) at the fourth beat in the first bar, and selects and operates the sound selecting button 7R and operates the picking lever 9 at the timing when a time corresponding to "0012" has elapsed from the starting point at the fourth beat in the first bar. The player also simultaneously selects and operates the sound selecting button 7R and the sound selecting button 7Y and operates the picking lever 9 at the starting point (000) at the first beat in the second bar.

The operation sequence section 28b includes changeover instructing information 28c in which the timing when the game screens 51 and 52 should be changed between the normal play and the right-hand play is written as being associated with the time in the music composition. For example, when the game screen is changed from the one during the normal play to the one during the right-hand play, "change lane position 2" is described in the changeover instructing information 28c. On the other hand, when the game screen is changed from the one during the right-hand play to the one during the normal play, i.e., when the position of each of the lanes 104G to 104O is returned to the default position, "change lane position 1" is described in the changeover instructing information 28c. The sequence operating section 28b also includes a high-fret operation describing section 28d in which the description for designating the operation timing of the respective buttons 8G to 8O at the high-fret operating section 8 is continuous. The description for designating the operating timing of the low-fret operating section 7 is not included between the changeover instructing information 28c and the high-fret operation describing section 28d. In the example in FIG. 5, the game screen is changed from the one during the normal play (see FIG. 3) to the one during the right-hand play (see FIG. 4) at the timing when the time corresponding to "0024" has elapsed from the starting point at the fourth beat in the third bar. Further, the player selects and operates the sound selecting button 8Y at the high-fret operating section 8 at the timing when the time corresponding to "0025" has elapsed from the starting point of the fourth beat in the third bar.

In the example in FIG. 5, the description of "03, 04, 024, button 9" to "03, 04, 026, button 7" corresponds to the high-fret operation describing section 28d, while the description of "03, 04, 024, button 9" corresponds to the description at the first operation timing of the high-fret operation describing section 28d. The same time may be designated for the changeover instructing information 28c and the description at the first operation timing of the high-fret operation describing section 28d, or a different time, which is after a lapse of the time designated by the changeover instructing information 28c, may be designated as the first operation timing of the high-fret operating section 28d. In FIG. 5, the condition defining section 28a is provided only at the head of the sequence data 28. However, the condition defining section 28a may be provided at a suitable position of the operation sequence section 28b. With this structure, the process of changing the tempo in the composition and the process of changing the assignment of the sound effect can be realized. Plural sequence data pieces 28, each having a different level of difficulty, may be prepared for the same music composition. In this case, information for identifying the level of difficulty is applied to the respective plural sequence data pieces 28. The changeover instructing information 28c may be included in the condition defining section 28a.

The sequence processing section 15 in the game control section 11 controls the display of each of the lanes 104G to 104O in such a manner that the object 106 agrees with the operation reference indicator 105 at the operation timing designated by above-described sequence data 28.

The process when the game control section 11 executes the music game will next be described. After the game control section 11 reads the game program 21 and ends the initial setting necessary for executing the music game, it waits until the player issues an instruction of the start of the game. The instruction for starting the game includes the operation of specifying the data used in the game, such as the operation of selecting a music composition that is to be played on the game or selecting a level of difficulty. The procedure of accepting the instruction may be the same as that in a known music game. When the start of the game is instructed, the game control section 11 reads the music composition data 25 corresponding to the music selected by a player, and outputs the resultant to the sound output control section 14, thereby starting the reproduction of the music composition from the speaker 6. Thus, the control unit 10 functions as a music reproducing device. The game control section 11 also reads the sequence data 28 corresponding to the player's selection in synchronism with the reproduction of the music composition. Then, the game control section 11 generates necessary image data 27 including the character 100 and the operation instructing area 101, while referring to the image data 27, and outputs the resultant to the display control section 12, whereby the necessary image including the character 100 and the operation instructing area 101 is displayed on the monitor 5. The game control section 11 repeatedly executes a sequence process routine illustrated in FIG. 6 and an operation evaluating routine illustrated in FIG. 7, at a predetermined cycle, as the processes necessary for displaying the operation instructing area 101, during the execution of the music game. The routine in FIG. 6 is performed by the sequence processing section 15, and the routine in FIG. 7 is performed by the operation evaluating section 16.

Figure 6:
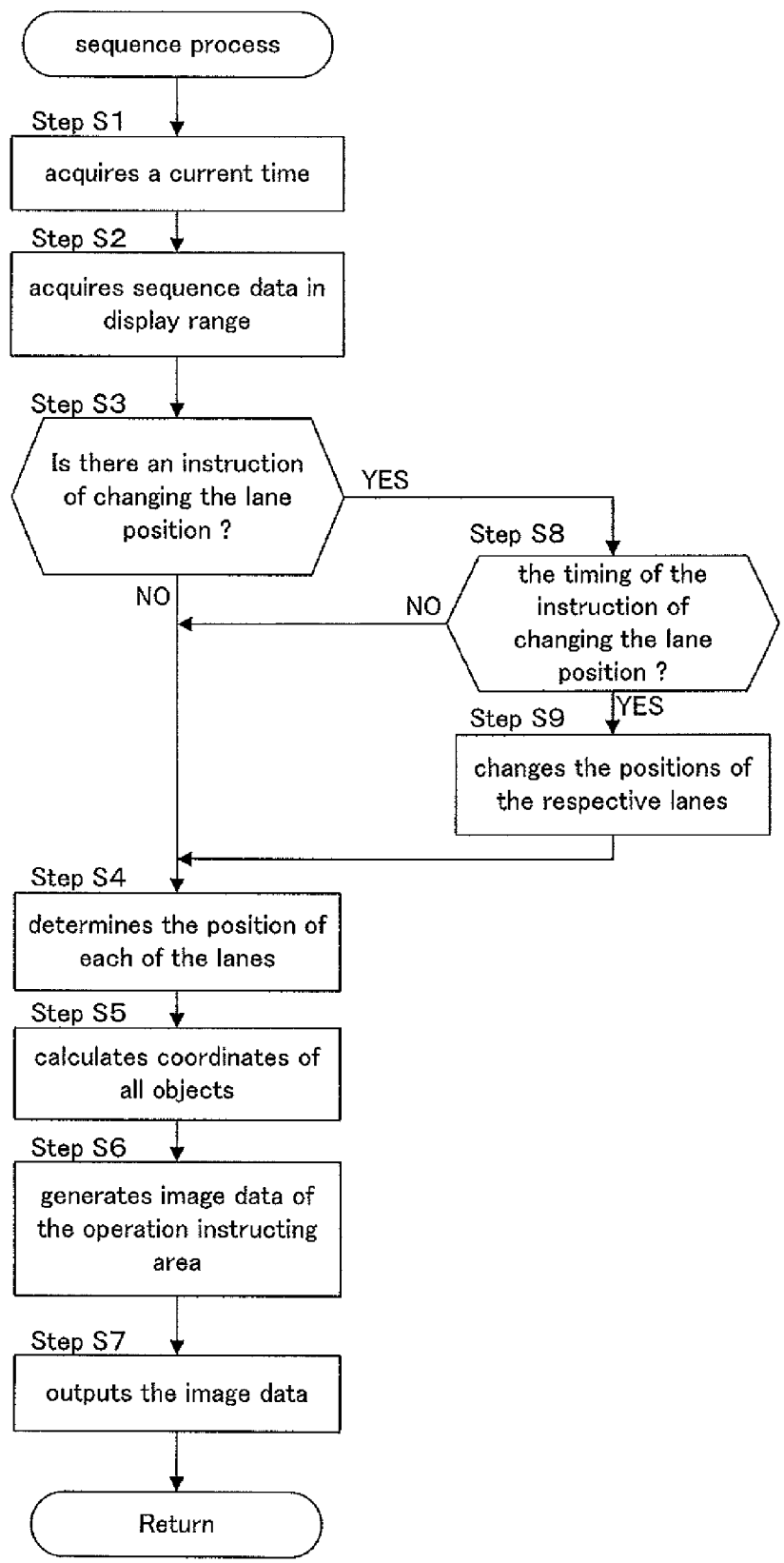
FIG. 6 is a flowchart illustrating one example of a sequence process routine executed by a game control section.
Figure 7:
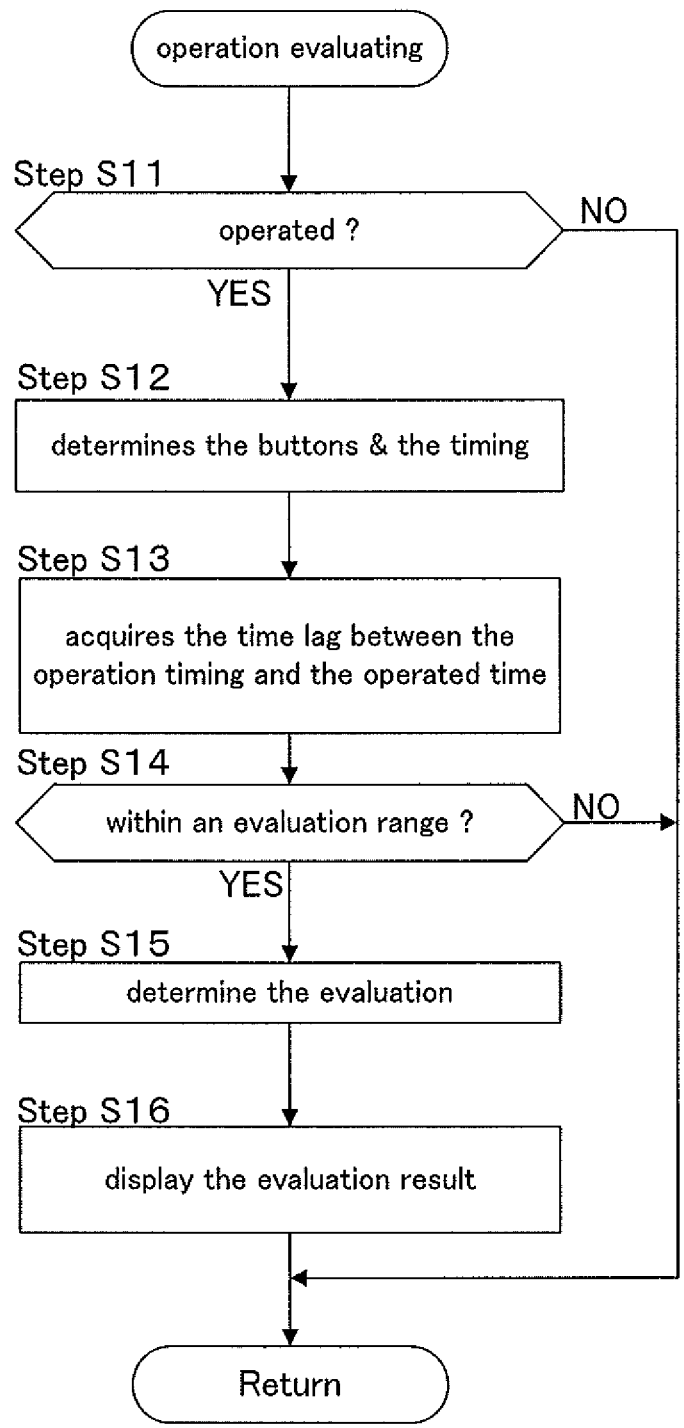
FIG. 7 is a flowchart illustrating one example of an operation evaluating routine executed by the game control section.

When the sequence process routine in FIG. 6 is started, the sequence processing section 15 in the game control section 11 acquires a current time on the music composition in step S1. The current time may be counted by an internal clock of the game control section 11 with the point of starting the reproduction of the music composition being defined as a reference, for example. In successive step S2, the sequence processing section 15 acquires data of the time length (display range) that should be displayed on the operation instructing area 101 from the sequence data 28. The display range is set to the time length corresponding to two bars in the music composition from the current time, for example.

In next step S3, the sequence processing section 15 determines whether or not there is an instruction of changing the lane position in the data acquired from the sequence data 28, i.e., whether or not there is either one of the instruction of "change lane position2" or the instruction of "change lane position1", in the example in FIG. 5. When the answer is positive in step S3, the sequence processing section 15 proceeds to step S8, while when the answer is negative, it proceeds to step S4.

In step S8, the sequence processing section 15 compares the acquired current time and the instruction of changing the lane position so as to determine whether the current time corresponds to the timing of the instruction of changing the lane position or not. When the sequence processing section 15 determines that the answer is positive in step S8, it proceeds to step S9. When the sequence processing section 15 determines that the answer is negative, it proceeds to step S4. In step S9, the sequence processing section 15 changes the positions of the respective lanes 104G to 104O at the predetermined positions, which are determined beforehand, in accordance with the instruction of changing the lane position. In the example in FIG. 5, the character 100 and the operation instructing area 101 are moved in such a manner that the operation instructing area 101 is moved to the position above the character 100 based upon the instruction of "change lane position2", or the operation instructing area 101 is moved to the default position below the character 100 based upon the instruction of "change lane position1", whereby the starting position 102 and the reaching position 103 of the lanes 104G to 104O are changed.

In step S4, the sequence processing section 15 determines the position of each of the lanes 104G to 104O. In this process, when the sequence processing section 15 does not go through the steps S8 and S9, the lane 104 is maintained to the position determined in the previous routine. In this case, in the first execution of the routine in FIG. 6, the position of the lane 104 determined in the previous routine is not present. Therefore, the position of the lane 104 is determined to be the default position. On the other hand, when the sequence processing section 15 executes the changeover of the lane position through the steps S8 and S9, the position of the lane 104 is determined to be the changed position.

In next step S5, the sequence processing section 15 calculates coordinates of all objects 106, which should be displayed on the respective lanes 104G to 104O, in the operation instructing area 101. The calculation will be made as described below, for example. The sequence processing section 15 determines on which one of the lanes 104G to 104O the object 106 should be arranged, based upon the designations of the respective lanes 104G to 104O associated with the operation timing included in the display range, i.e., based upon any one of the designations of "button1" to "button10". The sequence processing section 15 also determines the position of each of the objects 106 on each of the lanes 104G to 104O in the time-axis direction (specifically, the moving direction of the object 106) from the operation reference indicator 105 according to the time difference between the respective operation timings and the current time. With this process, the coordinates of the objects 106, which are needed to arrange the objects 106 on the designated respective lanes 104G to 104O along the time axis from the operation reference indicator 105, can be acquired.

In next step S6, the sequence processing section 15 generates image data necessary for drawing the operation instructing area 101 based upon the lane position determined in step S4 and the coordinate of the object 106 calculated in step S5. Specifically, it generates the image data in order that the respective lanes 104G to 104O are displayed on the determined lane positions and the object 106 is arranged at the calculated coordinate on each of the lanes 104G to 104O. The images of the respective lanes 104G to 104O and the objects 106 may be acquired from the image data 27.

In step S7, the sequence processing section 15 outputs the image data to the display control section 12. Thus, the operation instructing area 101 is displayed onto the monitor 5. After completing the process in step S7, the sequence processing section 15 ends the execution of this sequence process routine. When the above-mentioned process is executed, the objects 106 are moved and displayed onto the respective lanes 104G to 104O in order that the objects 106 reach the operation reference indicator 105 at the operation timing described in the sequence data 28, and the position where the respective lanes 104G to 104O are displayed, i.e., the position where the operation instructing area 101 and the character 100 are displayed, is changed at a suitable timing in the music composition.

The operation evaluating routine in FIG. 7 will be described next. When the operation evaluating routine in FIG. 7 is started, the operation evaluating section 16 refers to the output signal from the guitar controller 4 so as to determine whether the respective buttons 7G to 7O and 8G to 8O and the picking lever 9 are operated or not in step S11. The operation evaluating section 16 determines whether they are operated or not by determining the operation output signal based upon the output signal from the guitar controller 4. When a signal indicating that the respective buttons 7G to 7O at the low-fret operating section 7 are selected and operated is output, the operation evaluating section 16 determines that the operation output signal is output by the output of the signal that is output within a fixed period from the operation of the respective buttons 7G to 7O and that indicates the operation of the picking lever 9. On the other hand, when a signal indicating that the respective buttons 8G to 8O at the high-fret operating section 8 are selected and operated is output, the operation evaluating section 16 determines that the operation output signal is output by the output of the signal that indicates the operation of the respective buttons 8G to 8O. When the output signal indicating the operation of the buttons 7G to 7O and 8G to 8O and the picking lever 9 is not output, when the output signal is the one indicating a mere operation of the buttons 7G to 7O at the low-fret operating section 7 or a mere operation of the picking lever 9 even when the output signal indicating these operations is output, and when the output signal is the one output after a lapse of a fixed time from the operation of the buttons 7G to 7O at the low-fret operating section 7 even when the output signal indicating these operations is output, it is determined that the operation output signal is not output. In step S11, the operation evaluating section 16 ends the execution of this routine, when the operation output signal is not output, while it proceeds to step S12 when the operation output signal is output.

In step S12, the operation evaluating section 16 determines which one of the buttons 7G to 7O and 8G to 8O is selected and operated, and determines the timing (time on the music composition) when the operation output signal is output, based upon the output signal output from the guitar controller 4. In next step S13, the operation evaluating section 16 specifies the operation timing closest to the timing described in the sequence data 28 for the lane corresponding to each of the buttons 7G to 7O and 8G to 8O that is selected and operated, i.e., the closest operation timing in terms of time on the sequence data 28 for the lane corresponding to each of the buttons 7G to 7O and 8G to 8O that is selected and operated, and acquires the time lag between the operation timing and the time when the operation output signal is output.

Figure 8:
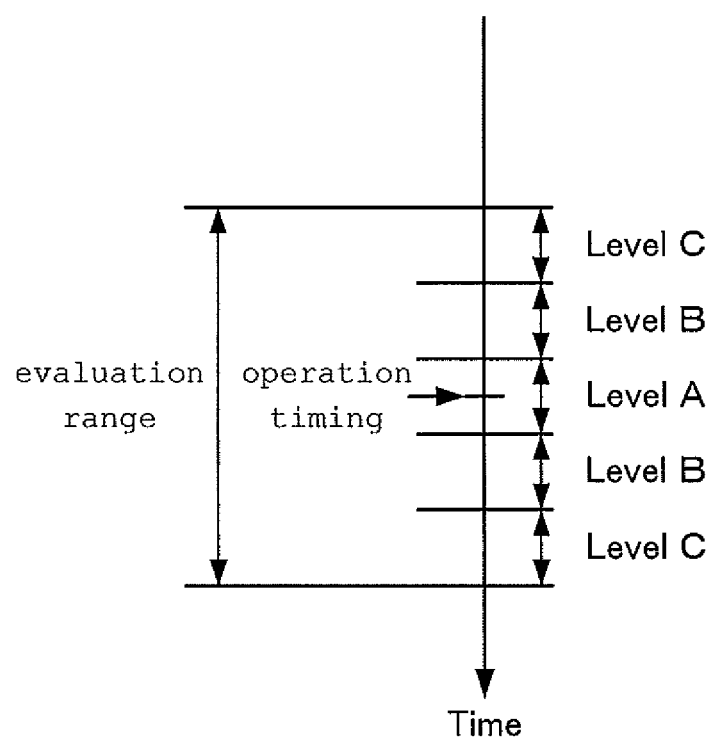
FIG. 8 is a view illustrating a relationship between operation timing and an evaluation range.

In next step S14, the operation evaluating section 16 determines whether or not the time lag is within an evaluation range so as to determine whether the player's operation is appropriate or not. The evaluation range is set within a predetermined time range before and after the operation timing that is to be compared. For example, as illustrated in FIG. 8, plural levels (levels A to C in FIG. 8) are set with the operation timing being defined as a reference, and the time range where these levels are set is handled as the evaluation range. In step S14, when the time lag is outside the evaluation range, the operation evaluating section 16 ends the execution of this routine, while when the time lag is within the evaluation range, it proceeds to step S15. In step S15, the operation evaluating section 16 determines to which one of the levels A to C the time lag acquired in step S13 belongs, so as to determine the evaluation for the player's operation to the guitar controller 4. The level A is the highest evaluation, and the evaluation is lowered in the order of B and C. Then, the operation evaluating section 16 proceeds to step S16, and the operation evaluating section 16 controls the output to the display control section 12 so as to display the evaluation result on the monitor 5 in step S16. After completing the process in step S16, the operation evaluating section 16 ends the execution of this routine.

As described above, at the time associated with the instruction of "change lane position" in the changeover instructing information 28c contained in the sequence data 28, the game screen is changed between the game screen 51 during the normal play and the game screen 52 during the right-hand play in the game machine 1 according to the present embodiment. With this process, the display position of each of the lanes 104G to 104O and the moving direction of the object 106 can be changed, whereby the operation guidance can be functioned as a means for enhancing variety of the game. In the present embodiment, the position and the posture of the character 100 are changed according to the change in the display position of each of the lanes 104G to 104O, whereby a change in the line of sight of the player and the change in the posture of the player can be induced. In particular, the respective lanes 104G to 104O move toward the upper position during the right-hand play, which induces the player to maintain a posture close to the posture during when he/she actually plays a guitar, i.e., induces a player to maintain a low posture or a posture lifting the neck of the guitar. Thus, the player can plays a guitar in more reality, whereby the variety of the game can further be enhanced. The game control section 11 may determine predetermined operation to the guitar controller 4, such as lifting up the neck, corresponding to the game screen 52 during the right-hand play, based upon the information about the tilt detected by the tilt detecting device provided to the guitar controller 4, and may give to the player a benefit including the output of loud cheers from the speaker 6 and addition of additional point, according to the predetermined operation. Thus, a realistic sensation of the game can be enhanced.

In the present embodiment, the external storage device 20 of the game machine 1 functions as the music composition data storing device, and the sequence data storage device. The control unit 10 allows the sequence processing section 15 to execute the processes in steps S1, S2, and steps S4 to S7 in FIG. 6, thereby functioning as the operation guiding device. The control unit 10 also allows the sequence processing section 15 to execute the processes in steps S3, S8, and S9 in FIG. 6, thereby functioning as a path changing device and an area position changing device. The state in which the operation instructing area 101 is displayed at the lower part in the game screen, i.e., the state in which the starting position 102 and the reaching position 103 of the lane 104 are displayed at the lower part in the game screen as illustrated in FIG. 3, corresponds to a normal state for the display, while the state in which the operation instructing area 101 is displayed at the upper part in the game screen, i.e., the state in which the starting position 102 and the reaching position 103 of the lane 104 are displayed at the upper part in the game screen as illustrated in FIG. 4, corresponds to an exceptional state for the display. The state in which the starting position 102 of the lane 104 is located above the reaching position 103 as illustrated in FIG. 3 corresponds to the normal state for the displacement, and the state in which the starting position 102 of the lane 104 is located below the reaching position 103 as illustrated in FIG. 4 corresponds to the exceptional state for the displacement. The state in which the operation instructing area 101 is located below the character 100, i.e., at the lower part of the game screen 51, as illustrated in FIG. 3, corresponds to the normal state for the area position, and the state in which the operation instructing area 101 is located above the character 100, i.e., at the upper part of the game screen 52, as illustrated in FIG. 4, corresponds to the exceptional state for the area position. The state in which the initial position 105D of the operation reference indicator 105 is located at the lower part of the operation instructing area 101 in the normal state for the area position, i.e., located at the lower part of the game screen 51, as illustrated in FIG. 3, corresponds to the exceptional state for the initial position, and the state in which the initial position 105D of the operation reference indicator 105 is located at the upper part of the operation instructing area 101 in the normal state for the area position, i.e., located at the upper part of the game screen 52, as illustrated in FIG. 4, corresponds to the exceptional state for the initial position. The respective lanes 104G to 104O correspond to predetermined paths.

The present invention is not limited to the above-mentioned embodiment, but can be embodied in a suitable embodiment. In the above-mentioned embodiment, the operation evaluating section 16 determines that the operation output signal is output by the output of the signal indicating the selecting operation of the buttons 8G to 8O at the high-fret operating section 8 in the routine in FIG. 7. However, the present invention is not limited thereto. The operation evaluating section 16 may determine that the operation output signal is output by the output, which is output within a fixed time from the output of the signal indicating the operation of the buttons 8G to 8O and indicates the operation of the picking lever 9, even when the signal indicating the operation of the buttons 8G to 8O at the high-fret operating section 8 is output. In this case, the operation evaluating section 16 may determine that the operation output signal is not output by the mere output indicating the mere operation of the buttons 8G to 8O at the high-fret operating section 8 and by the output signal, which is output after a lapse of fixed time from the output of the signal indicating the operation of the buttons 8G to 8O and which indicates the operation of the picking lever 9. In the above-mentioned embodiment, when the respective buttons 7G to 7O at the low-fret operating section 7 are selected and operated and the picking lever 9 is also operated on the game screen 52 during the right-hand play, these operations are enabled. However, it may be configured such that these operations are disabled. With this configuration, the right-hand play can be promoted on the game screen during the right-hand play.

In the above-mentioned embodiment, it is configured such that the selecting operation of the high-fret operating section 8 is enabled even on the game screen 51 during the normal play. However, this selecting operation may be disabled. When the selecting operation of the high-fret operating section 8 is disabled on the game screen 51 during the normal play, it can be prevented that the operation of the high-fret operating section 8, in which the operation amount before the operation output signal is output is smaller than that in the case of selecting and operating the low-fret operating section 7 in the operation evaluating routine, is used on the game screen 51 for the normal play. In this case, whether the selecting operation of the high-fret operating section 8 is enabled or disabled may be changed according to the instruction of changing the game screen between the one for the normal play and the one for the right-hand play, i.e., according to the instructions of "change lane position2" and "change lane position1" in FIG. 5. As an input device, not only a dedicated controller such as the guitar controller is used, but also various types of input devices such as a touch panel, push button, lever, and track ball can be used.

In the above-mentioned embodiment, the starting position and the reaching position of the predetermined path is changed based upon the instruction described in the operation sequence data. However, the present invention is not limited thereto. For example, the game control section 11 may be configured such that it determines the predetermined operation in which the tilt of the guitar controller 4 in a predetermined direction is more than a fixed value based upon the information of the tilt detected by the tilt detecting device, and the path changing device changes the starting position and the reaching position of the predetermined path according to the predetermined operation. In this case, the game screen can be changed according to the operation of an actual guitar player who tilts the guitar in a fixed direction during the right-hand play, the reality sensation can be created. The predetermined operation to the input device is not limited to the operation in which the tilt in the predetermined direction becomes more than a fixed value based upon the information of the tilt detected by the tilt detecting device. Various operations made by a player, such as the operation of the button, can be employed as the predetermined operation. The present invention can also be embodied even by a guitar controller having no tilt detecting device. For example, the operation evaluating section serving as an operation evaluating device may be configured to output an instruction according to the evaluation result for the player's operation of the guitar controller, and the path changing device may be configured to change the starting position and the reaching position of the predetermined path based upon the instruction according to the evaluation result from the operation evaluating section. In this case, the game screen can be changed according to the level of the player. Specifically, when the evaluation of the player is good, the game screen is changed, and when the evaluation of the player is poor, the game screen is not changed. Therefore, the level of difficulty of the game can more suitably be changed. When plural sequence data pieces, each having a different level of difficulty, are prepared for the same music composition, the instruction for changing the starting position and the reaching position of the predetermined path may be eliminated from the sequence data having a low level of difficulty. When the sequence data is classified by the level of difficulty such as EASY, MEDIUM, and HARD, the instruction for changing the starting position and the reaching position of the predetermined path may be eliminated from the sequence data classified into EASY. When the sequence data pieces according to the level of difficulty are prepared, and the operation evaluating device is configured to output the instruction of changing the starting position and the reaching position of the predetermined path, the path changing device does not have to change the starting position and the reaching position of the predetermined path regardless of the instruction from the operation evaluating section, when the sequence data having a low level of difficulty is used. In this case, the level of difficulty of the game can be changed according to not only the player's level but also the classification of the sequence data.

In the above-mentioned embodiment, the predetermined path is displayed on the game screens 51 and 52. However, the present invention is not limited thereto. For example, the predetermined path may be flickered or may not be displayed on the game screen. The predetermined path is not limited to be a straight line. For example, the predetermined path may be a curved line. In the above-mentioned embodiment, the operation reference indicator does not move from the initial position, but the operation instructing indicator moves toward the operation reference indicator. However, the present invention is not limited thereto. For example, as for the operation guiding device, the operation instructing indicator is not moved, but the operation reference indicator is moved to realize the relative displacement between both indicators. In this case, it may be controlled such that the operation instructing indicator is updated at a time for every predetermined display range (e.g., the time length corresponding to two bars), and the operation reference indicator moves from the initial position that is near the starting position toward the reaching position, every time the display range is updated. The present invention is applicable to the case in which only a single operating section is provided. Even when the plural operating sections are provided, the operation guiding device may guide the operation in a form different from the form in which the operation instructing indicator is displayed for the respective predetermined paths defined for every operation section, so long as the operation instructing indicator can be displayed in the form by which the corresponding operating section can be determined, the operation instructing indicator and the operation reference indicator are displayed along the predetermined path in the order of time, and a relative displacement that is according to the progression of the game and that is along the predetermined path is produced between the operation reference indicator and the operation instructing indicator. For example, a different symbol is assigned to each of the plural operating sections, and the operation instructing indicator is changed for each of the operating sections according to each symbol. With this configuration, a player can determine which one of the plural operating sections should be operated, even if the operation instructing indicators of the respective operation sections are arranged on the same path.

Figure 9:
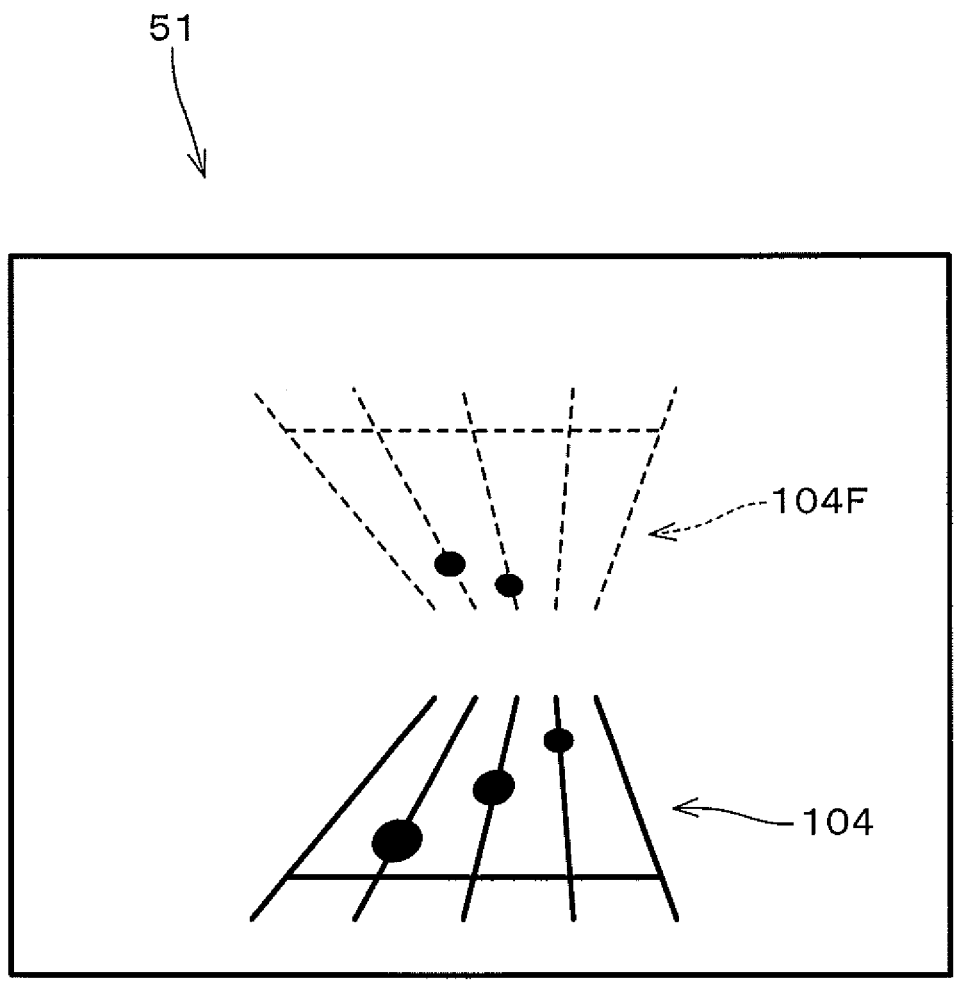
FIG. 9 is a view schematically illustrating the case in which respective lanes displayed on the game screen during the right-hand play are displayed beforehand in a translucent manner.

In the above-mentioned embodiment, the operation guiding device sets the starting position and the reaching position in such a manner that the predetermined path is located at the lower part of the game screen, which is the normal state for the display. However, the present invention is not limited thereto. Similarly, the operation guiding device sets the starting position to the position above the reaching position in such a manner that relative displacement along the predetermined path between the operation reference indicator and the operation instructing indicator is generated from the upper part toward the lower part, which is the normal state for the displacement. However, the present invention is not limited thereto. The operation guiding device may set the starting position and the reaching position in order that the predetermined path is located at the optional position as the normal state. For example, the operation guiding device may set the predetermined path at the right side in the game screen, or may set the starting position below the reaching position, as the normal position. The operation guiding device may guide the predetermined path, whose position has already been changed by the path changing device, as being capable of being expected before the actual change. FIG. 9 schematically illustrates the case in which the respective lanes 104 displayed on the game screen 52 during the right-hand play are translucently displayed beforehand. For example, as illustrated in FIG. 9, the position of the changed predetermined path is translucently displayed as indicated by a broken line 104F before the position of the predetermined path is actually changed, which can prevent the player from losing sight of the object with the change in the position of the predetermined path. Since the path to be changed is displayed beforehand, the changing timing of the path can be guided in an easy-to-understand manner.

The path changing device changes the starting position and the reaching position in order that the predetermined path is located at the upper part in the game screen as the exceptional state for the display. However, the present invention is not limited thereto. Similarly, the path changing device changes the starting position to the position below the reaching position in order that the relative displacement along the predetermined path between the operation instructing indicator and the operation reference indicator is generated from the lower part to the upper part, as the exceptional state for the displacement. However, the present invention is not limited thereto. For example, the path changing device may change the starting position and the reaching position in order that the predetermined path is located at the right side of the game screen, as the exceptional state with respect to the normal state in which the predetermined path is set to the left side in the game screen. In this case, the state in which the predetermined path is located at the left side on the game screen can intuitively tell the player that this state guides the operation of the low-fret button, while the state in which the predetermined path is located at the right side on the game screen can intuitively tell the player that this state guides the operation of the high-fret button.

Figure 10A:
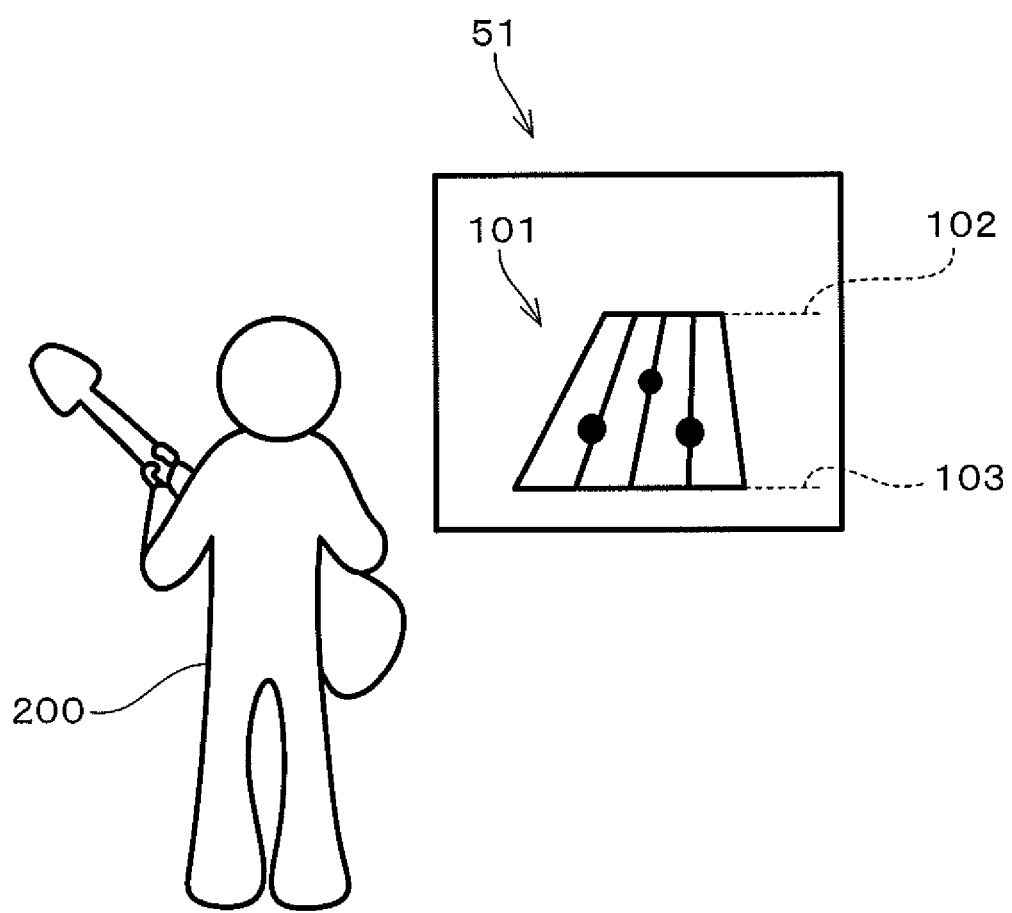
FIG. 10A is a view imitatively illustrating a game screen and a player during a normal play according to a first modification.
Figure 10B:
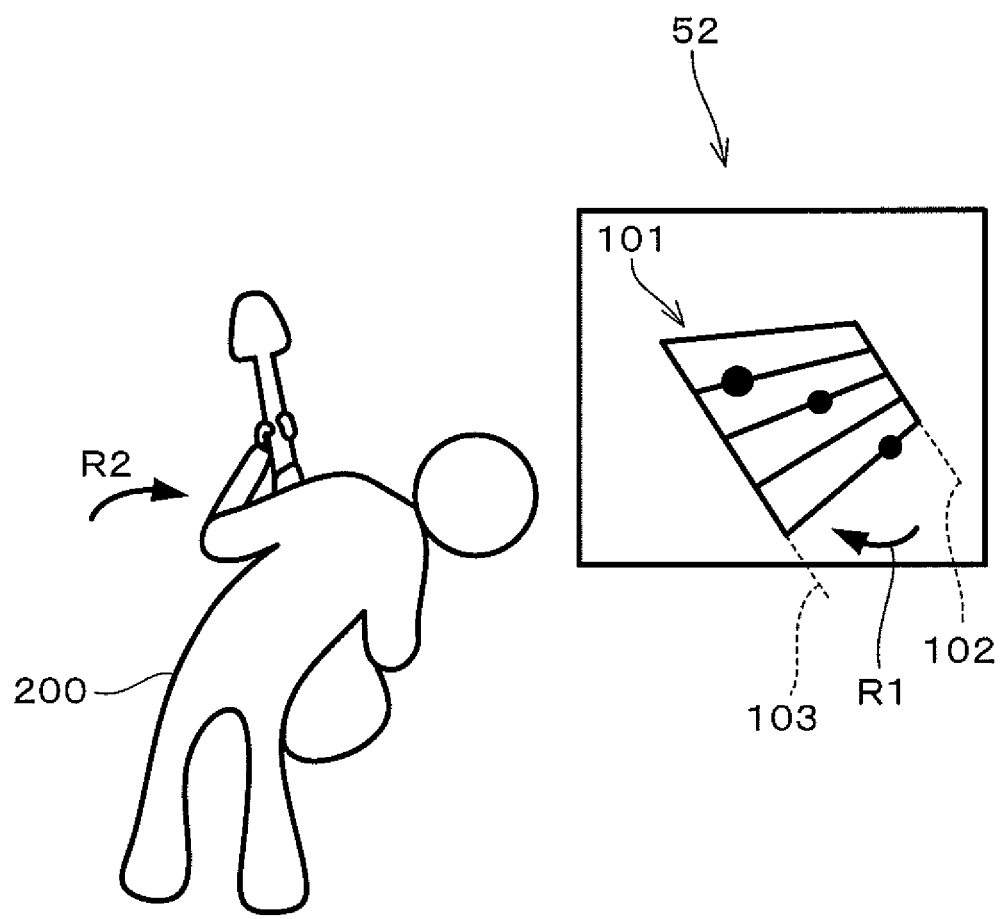
FIG. 10B is a view imitatively illustrating a game screen and a player during a right-hand play according to the first modification.
Figure 11:
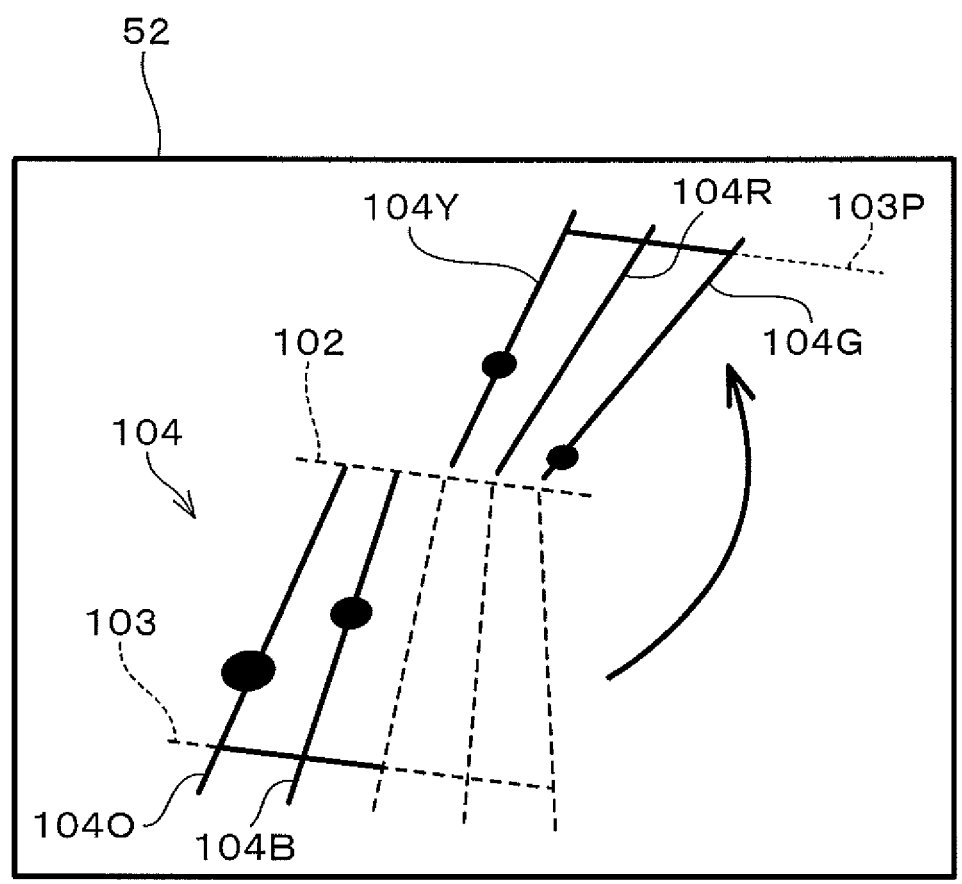
FIG. 11 is a view illustrating a second modification according to the present invention.

FIGS. 10A, 10B, and 11 illustrate modifications of the present invention. FIG. 10A imitatively illustrates the game screen 51 and the player 200 in a normal play according to a first modification. As illustrated in FIG. 10A, the operation instructing area 101 is set at the lower part of the game screen 51 for the normal play, i.e., on the game screen in a normal state. On the other hand, FIG. 10B imitatively illustrates the game screen 52 and the player in the right-hand play according to a first modification. As illustrated in FIG. 10B, the starting position 102 and the reaching position 103 tilt in the clockwise direction with respect to the game screen 52 for the right-hand play, i.e., in the exceptional state. Specifically, the operation instructing area 101 rotates in a clockwise direction to be tilted in a clockwise direction as indicated by an arrow R1 in FIG. 10B, compared to the game screen 51 representing the normal state. In the exceptional state, the operation instructing area 101 rotates in the clockwise direction, whereby the posture of the player 200 is promoted to move in the clockwise direction as indicated by an arrow R2 in FIG. 10B with the rotation of the operation instructing area 101. In this case, since the operation instructing area 101 is gradually rotated, it can be prevented that the player loses sight of the object. The speed of the rotation of the operation instructing area 101 may be sharp. When it is determined that the guitar controller is operated to be rotated corresponding to the rotation of the operation instructing area 101 with the rotation of the operation instructing area 101, a benefit such as cheers may be applied. As described above, the path changing device may change the starting position and the reaching position of the predetermined path to an optional position, as the exceptional state with respect to the starting position and the reaching position of the predetermined path set to an optional path as the normal state by the operation guiding device.

The path changing device may change only the starting position in order that the starting position is located above the reaching position, as the exceptional state with respect to the normal state in which the predetermined path is located at the lower part of the game screen, and the starting position is located below the reaching position. Alternatively, the path changing device may change both the starting position and the reaching position. Specifically, the path changing device is not limited to have the configuration in which the starting position and the reaching position of the predetermined path are changed, but it may change only one of the starting position and the reaching position of the predetermined path.

For example, the path changing device may change the starting position and the reaching position of only some of the plural lanes. FIG. 11 illustrates a second modification of the present invention. As illustrated in FIG. 11, the path changing device may change the reaching position 103 in the normal state to the reaching position 103P in the exceptional state for some lanes of 104G, 104R, and 104Y of the plural lanes 104. In this case, the operation of the low-fret button can be guided on the two lanes 104O and 104B at the left side having the reaching position 103 not changed, while the operation of the high-fret button can be guided on three lanes of 104G, 104R, and 104Y at the right side having the reaching position 103 in the exceptional state. In the second modification in FIG. 11, only the reaching position 103 of some lanes 104G, 104R, and 104Y is changed in the exceptional state. However, the starting position 102 may also be changed together with the reaching position 103, or only the starting position 102 may be changed.

Figure 12:
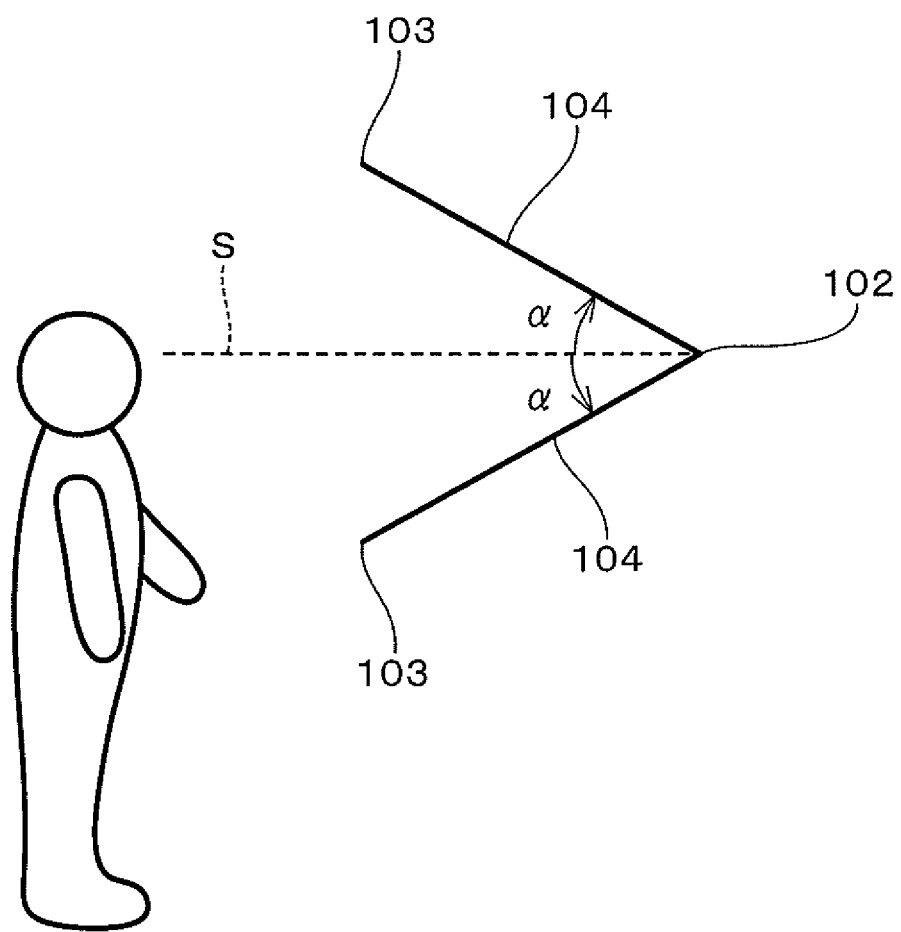
FIG. 12 is a view illustrating the case in which angles formed between a line of sight of a player and a lane before and after the changeover of the game screen are equal to each other, when the state in which a virtual 3D space expressed on the game screen is viewed from the side of the lane is imagined.
Figure 13:
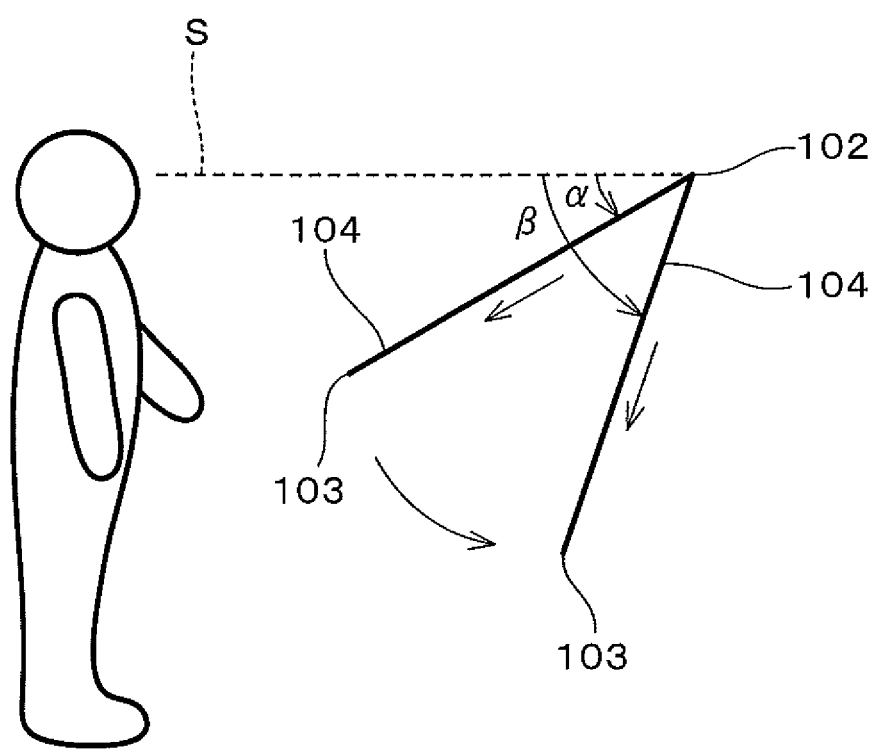
FIG. 13 is a view illustrating the case in which the reaching position of the lane is changed in order that the angle formed between a line of sight of a player and a lane is changed, when the state in which a virtual 3D space expressed on the game screen is viewed from the side of the lane is imagined.

In the above-mentioned embodiment, the reaching position 103 of the lane 104 is arranged at the diagonally lower part from the starting position 102, so that a virtual 3D space in which the lane 104 extends from the far side toward the near side can be expressed on the screen. In this case, the angle formed by the line of sight of the player and the lane 104 may be optional. For example, when the angle formed between the line of sight of the player and the lane 104 is 90 degrees on the game screen 51 during the normal play, a space having no depth, i.e., a two-dimensional space, can be expressed. On the other hand, when the angle is other than 90 degrees, a three-dimensional space having a depth can be expressed, and the player can feel that the depth of the space is increased, as the angle is made close to 0 degree or 180 degrees. Specifically, the degree of the depth of the virtual 3D space may optionally be expressed by the angle formed between the line of sight of the player and the lane 104. FIGS. 12 and 13 are views in which the case where the angle formed between the line of sight of the player S and the lane 104 is viewed from the side in the virtual 3D space is imagined. FIG. 12 illustrates the case in which the angle α formed between the line of sight of the player S and the lane 104 on the game screen 51 for the normal play and the angle α on the game screen 52 for the right-hand play are equal to each other. In this case, the angle formed when the player looks up the lane 104 and the angle formed when the player looks down the lane 104 are equal to each other, whereby the player's feeling of strangeness before and after the change in the position of the reaching position 103 can be suppressed. The path changing device may change at least either one of the starting position and the reaching position in the operation instructing area 101 in order that the angle formed between the line of sight of the player S and the lane 104 is changed. FIG. 13 illustrates the case in which the path changing device changes the reaching position 103 of the lane 104 so as to change the angle α to an angle β. As illustrated in FIG. 13, the angle may be changed from α, which has a small slope with respect to the line of sight of the player S, to β, which has a large slope with respect to the line of sight of the player S, according to the status of the game. When the slope is small, the player can feel that the object gradually approaches from the far side, so that the movement of the object can be expressed as being relatively small. On the other hand, when the slope is great, the player can feel as if the object falls down from the upper part, so that the movement of the object can be expressed as being relatively great. Therefore, the sense of speed felt by the player can be changed by changing the angle formed between the line of sight of the player S and the lane 104, whereby the level of difficulty can be adjusted.

In the above-mentioned embodiment, the area changing device arranges the operation instructing area at the upper part of the game screen in the exceptional state for the area position, and the position of the character is changed to the lower part. Specifically, the positions of the other things are changed according to the change in the position of the operation instructing area, whereby an effect as if the player's eye moves in the 3D space is exhibited. However, the present invention is not limited thereto. For example, the positions of the other things such as the character are not changed, but only the position of the operation instructing area may be changed to the optional position such as at the upper part of the game screen, in the exceptional state for the area position. In the above-mentioned embodiment, in the exceptional state for the area position, the area position changing device changes the display position of the operation instructing area in the game screen, and the path changing device changes the starting position and the reaching position of the predetermined path in order that the operation reference indicator is displayed in the operation instructing area in the exceptional state for the area position. However, the present invention is not limited thereto. For example, the area position changing device may be eliminated. Specifically, the path changing device may change either one of the starting position and the reaching position of the predetermined path in the operation instructing area that is not changed from the predetermined position, in the state in which the position of the operation instructing area is not changed between the game screen for the normal play and the game screen for the right-hand play.

In the above-mentioned embodiment, a music composition is reproduced, and based upon the playing time of the music composition, the relative displacement according to the progression of the time on the game and along the predetermined path is produced between the operation reference indicator and the operation instructing indicator. However, the present invention is not limited thereto. For example, a video image that is changed with the lapse of time may be displayed on the screen, and the relative displacement along the predetermined path may be produced between the operation reference indicator and the operation instructing indicator based on the video image. Examples of considerable vide image include a flag-raising video image in which a flag is raised at a predetermined position at a predetermined time, a drive video image reaching a predetermined place at a predetermined time, and a dance video image in which the music composition is not made. In this case, the sequence data may have described therein an operation period of the operating section during the game. The operation guiding device may use the time on the game instead of the time on the music composition. Specifically, the game system of the present invention is not limited to a music game. Further, the game system according to the present invention may be realized by an appropriate form such as a coin-operated arcade game installed in a commercial facility, a stationary home game machine, a portable game machine, and a game system realized by utilizing network.

The invention claimed is:

1. A game system comprising:
an input device having at least one operating section;
a display device that displays and outputs a game screen;
a sequence data storage device that stores sequence data having described therein an operation timing of the operating section during the game; and
an operation guiding device that:
determines the operation timing of the operating section, which timing is included within a predetermined period range from a current time on the game to the future, based upon the sequence data,
displays an operation instructing indicator corresponding to the determined respective operation timings and an operation reference indicator corresponding to the current time in temporal order along a predetermined path on the game, and
produces a relative displacement, which is along the predetermined path and is according to the progression of the time on the game, between the operation reference indicator and the operation instructing indicator in order that the operation instructing indicator agrees with the operation reference indicator at the operation timing that should be indicated by the operation instructing indicator, by which the operation on the operating section is guided to a player,
wherein the operation guiding device includes a path changing device that changes at least either one of a starting position and a reaching position of the predetermined path;
wherein the operation guiding device includes an area position changing device that sets the operation instructing area, which is an area on which the operation instructing indicator and the operation reference indicator are displayed, to a predetermined position in the game screen as a normal state for an area position, and change the position of the area, which is set as the operation instructing area in the game screen, in an exceptional state with respect to the normal state for the area position in order to indicate a change of at least one of a operation content and a operation posture of the player so that the operation instructing area in the exceptional state includes at least different area from the operation instructing area in the normal state,
wherein the path changing device changes at least either one of the starting position and the reaching position of the predetermined path in order that the operation instructing indicator and the operation reference indicator are displayed in the operation instructing area in the exceptional state for the area position, and
wherein an amount of operation instructing indicators increases during the exceptional state.

2. The game system according to claim 1, wherein the operation guiding device sets the initial position of the operation reference indicator, which is arranged on the predetermined path in order to produce the relative displacement along the predetermined path, to a predetermined position in the game screen as a normal state for the initial position.

3. The game system according to claim 1, wherein
the input device includes a plurality of operating sections,
the operation timing is written in the sequence data as being associated with information designating any one of the operating sections, and
the operation guiding device displays the operation instructing indicator in the manner in which the operating section corresponding to each operation timing can be identified.

4. The game system according to claim 3, wherein the operation guiding device specifies a plurality of predetermined paths so as to correspond to the operating sections, wherein the operation instructing indicator corresponding to each operation timing is displayed in temporal order along the predetermined path corresponding to each of the operating sections on the game, whereby the operation instructing indicator is displayed in the manner in which the operating section corresponding to each operation timing can be identified.

5. The game system according to claim 3 or 4, a guitar controller which is shaped like a guitar is provided as the input device, which includes a body, a neck extending from the body, a head arranged at the leading end of the neck, and as the plural operating sections, a low-fret operating section arranged in the vicinity of the head of the neck and a high-fret operating section arranged in the vicinity of the neck, and wherein
the sequence data includes a high-fret operation describing section in which operation timings for the high-fret operating section are successive, and
the path changing device changes at least either one of the starting position and the reaching position of the predetermined path when the first operation timing described in the high-fret describing section has come.

6. The game system according to claim 5, wherein the operation guiding device sets the starting position and the reaching position in such a manner that the predetermined path is located at the lower part of the game screen as a normal state for the display, and the path changing device changes the starting position and the reaching position of the predetermined path, as an exceptional state with respect to the normal state for the display, in such a manner that the starting position and the reaching position of the predetermined path is located at the upper part of the game screen, when the first operation timing described in the high-fret operation describing section has come.

7. The game system according to claim 5, wherein the operation guiding device sets the starting position above the reaching position, as a normal state for a displacement, in order that the relative displacement along the predetermined path between the operation reference indicator and the operation instructing indicator is produced from the upper part to the lower part, and the path changing device changes at least either one of the starting position and the reaching position of the predetermined path, as an exceptional state with respect to the normal state for the displacement, in such a manner that the starting position is located below the reaching position and relative displacement along the predetermined path between the operation reference indicator and the operation instructing indicator is produced from the lower part toward the upper part.

8. The game system according to claim 1, wherein the path changing device changes either one of the starting position and the reaching position of the predetermined path according to a predetermined operation for the input device.

9. The game system according to claim 1, further comprising:
a sound output device that reproduces and outputs a game sound;
a music composition data storage device that stores music composition data for reproducing music composition data; and
a music composition reproducing device that reproduces the music composition from the sound output device based upon the music composition data, wherein
the sequence data has described therein the operation timing of the operating section during the reproduction of the music composition, and
the operation guiding device determines the operation timing of the operating section included in a predetermined period from the current time toward the future on the music composition, based upon the sequence data, and produces the relative displacement along the predetermined path between the operation reference indicator and the operation instructing indicator according to the progression of the time on the music composition.

10. The game system according to claim 1, wherein the operation guiding device produces the relative displacement along the predetermined path by moving the operation instructing indicator toward the operation reference indicator.

11. A non-transitory computer-readable medium containing a computer program for a game system, the computer program including instructions adapted and configured to cause a computer incorporated into a game system, which comprises an input device having at least one operating section, a display device that displays and outputs a game screen, and a sequence data storage device that stores sequence data having described therein an operation timing of the operating section during the game, to function as:
an operation guiding device that determines the operation timing of the operating section, which timing is included within a predetermined period range from a current time on the game to the future, based upon the sequence data, displays an operation instructing indicator corresponding to the determined respective operation timings and an operation reference indicator corresponding to the current time in temporal order along a predetermined path on the game, and
produces a relative displacement, which is along the predetermined path and is according to the progression of the time on the game, between the operation reference indicator and the operation instructing indicator in order that the operation instructing indicator agrees with the operation reference indicator at the operation timing that should be indicated by the operation instructing indicator, by which the operation on the operating section is guided to a player,
wherein the operation guiding device to serve further as a path changing device that changes at least either one of a starting position and a reaching position of the predetermined path,
wherein the operation guiding device includes an area position changing device that sets the operation instructing area, which is an area on which the operation instructing indicator and the operation reference indicator are displayed, to a predetermined position in the game screen as a normal state for an area position, and change the position of the area, which is set as the operation instructing area in the game screen, in an exceptional state with respect to the normal state for the area position in order to indicate a change of at least one of a operation content and a operation posture of the player so that the operation instructing area in the exceptional state includes at least different area from the operation instructing area in the normal state,
wherein the path changing device changes at least either one of the starting position and the reaching position of the predetermined path in order that the operation instructing indicator and the operation reference indicator are displayed in the operation instructing area in the exceptional state for the area position; and wherein an amount of operation instructing indicators increases during the exceptional state.

12. The game system according to claim 1, wherein an orientation of the starting position and the reaching position of the predetermined path is rotated to promote a particular posture of the player.

13. The game system according to claim 12, wherein the input device is guitar-shaped and the particular posture of the player is a posture of an actual guitar player who tilts an actual guitar in a fixed direction.

14. The computer-readable medium according to claim 11, wherein an orientation of the starting position and the reaching position of the predetermined path is rotated to promote a particular posture of the player.

15. The computer-readable medium according to claim 14, wherein the input device is guitar-shaped and the particular posture of the player is a posture of an actual guitar player who tilts an actual guitar in a fixed direction.

* * * * *